(12) United States Patent
Normann et al.

(10) Patent No.: US 9,858,605 B2
(45) Date of Patent: *Jan. 2, 2018

(54) METHODS AND APPARATUS FOR GENERATING A UNIQUE VIRTUAL ITEM

(71) Applicant: Midnight Studios, Inc., Round Rock, TX (US)

(72) Inventors: Charles Dean Normann, Georgetown, TX (US); Kevin Gene Normann, Georgetown, TX (US); Omar Besim Hakim, Austin, TX (US)

(73) Assignee: Midnight Studios, Inc., Round Rock, TX (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/053,877

(22) Filed: Feb. 25, 2016

(65) Prior Publication Data

US 2016/0180425 A1    Jun. 23, 2016

Related U.S. Application Data

(63) Continuation of application No. 14/475,027, filed on Sep. 2, 2014, now abandoned, which is a continuation (Continued)

(51) Int. Cl.
    *G06F 15/16*        (2006.01)
    *G06Q 30/06*        (2012.01)
    (Continued)

(52) U.S. Cl.
    CPC ......... *G06Q 30/0621* (2013.01); *A63F 13/30* (2014.09); *A63F 13/60* (2014.09);
    (Continued)

(58) Field of Classification Search
    CPC ... G06F 15/16; H04L 29/08072; G06Q 10/06; G06Q 40/123
    (Continued)

(56) References Cited

U.S. PATENT DOCUMENTS

| | | | |
|---|---|---|---|
| 6,532,488 B1 * | 3/2003 | Ciarlante | H04L 69/329 709/205 |
| 7,644,414 B2 * | 1/2010 | Smith | G06F 8/20 709/201 |

(Continued)

FOREIGN PATENT DOCUMENTS

WO      2009007701      1/2009

OTHER PUBLICATIONS

Wiliams, D., Yee, N. and Caplan, S.E (2008), "Who plays, how much, and why? Debunking the stereotypical gamer profile." Journal of Computer-Mediated Communication, 13: 993-1018.

*Primary Examiner* — Khanh Dinh
(74) *Attorney, Agent, or Firm* — Michael Best & Friedrich, LLP

(57) ABSTRACT

Methods and apparatus for generating a unique virtual item are disclosed. In some embodiments, an encoding specification for a unique virtual item is generated. One or more components of the encoding specification influence properties of the unique virtual item. The generating includes deriving a first set of the one or more components from a plurality of items of personalization information. One or more item characteristics for the unique virtual item are created from the encoding specification. The one or more item characteristics describe a unique feature set for the unique virtual item in terms customized for a type of a rendering client. The creating the one or more item characteristics further comprises selecting based on the one or more components the unique feature set from options offered by a rule set.

20 Claims, 17 Drawing Sheets

Related U.S. Application Data of application No. 13/177,186, filed on Jul. 6, 2011, now Pat. No. 8,843,585.

(60) Provisional application No. 61/361,823, filed on Jul. 6, 2010, provisional application No. 61/450,621, filed on Mar. 9, 2011, provisional application No. 61/449,397, filed on Mar. 4, 2011.

(51) Int. Cl.

| | |
|---|---|
| *H04L 29/08* | (2006.01) |
| *H04N 21/8543* | (2011.01) |
| *H04N 21/8545* | (2011.01) |
| *A63F 13/85* | (2014.01) |
| *A63F 13/60* | (2014.01) |
| *A63F 13/79* | (2014.01) |
| *A63F 13/30* | (2014.01) |
| *G06F 3/0482* | (2013.01) |
| *G06F 3/0484* | (2013.01) |
| *G06T 15/00* | (2011.01) |

(52) U.S. Cl.
CPC ............ *A63F 13/79* (2014.09); *A63F 13/85* (2014.09); *G06F 3/0482* (2013.01); *G06F 3/04842* (2013.01); *G06F 3/04845* (2013.01); *G06F 3/04847* (2013.01); *G06T 15/00* (2013.01); *H04L 29/08072* (2013.01); *H04N 21/8543* (2013.01); *H04N 21/8545* (2013.01); *A63F 2300/5553* (2013.01)

(58) Field of Classification Search
USPC ............ 709/203, 220, 228; 705/30, 35, 305
See application file for complete search history.

(56) References Cited

U.S. PATENT DOCUMENTS

| | | | |
|---|---|---|---|
| 8,539,359 B2* | 9/2013 | Rapaport | G06Q 10/10 709/217 |
| 8,843,585 B1* | 9/2014 | Normann | H04N 21/8543 709/217 |
| 9,329,762 B1* | 5/2016 | Schultz | G06F 3/04845 |
| 9,569,781 B2* | 2/2017 | Tuchman | H04L 63/104 |
| 2003/0081004 A1 | 5/2003 | Liguori | |
| 2007/0206003 A1 | 9/2007 | Yoshida et al. | |
| 2008/0215973 A1 | 9/2008 | Zalewski et al. | |
| 2009/0270694 A1* | 10/2009 | Hyde | A61B 3/112 600/301 |
| 2010/0100826 A1 | 4/2010 | Hawthorne et al. | |
| 2010/0162137 A1* | 6/2010 | Ganz | G06F 3/011 715/757 |
| 2010/0174593 A1 | 7/2010 | Cao et al. | |
| 2010/0235319 A1 | 9/2010 | Liu et al. | |
| 2011/0025707 A1 | 2/2011 | Fujioka | |
| 2014/0214473 A1* | 7/2014 | Gentile | G06Q 10/06313 705/7.23 |

* cited by examiner

METHODS AND APPARATUS FOR GENERATING A UNIQUE VIRTUAL ITEM

CLAIM OF PRIORITY TO PROVISIONAL PATENT APPLICATION

This application is a continuation of U.S. patent application Ser. No. 14/475,027 entitled "Methods and Apparatus for Generating a Unique Virtual Item", filed Sep. 2, 2014, which is a continuation of U.S. patent application Ser. No. 13/177,186 entitled "Methods and Apparatus for Generating a Unique Virtual Item" filed Jul. 6, 2011, now U.S. Pat. No. 8,843,585, which claims benefit of priority of U.S. Provisional Application Ser. No. 61/361,823 entitled "Virtual DNA" filed Jul. 6, 2010, U.S. Provisional Application Ser. No. 61/450,621 entitled "Virtual Object Based on Unique Identifier" filed Mar. 9, 2011, and of U.S. Provisional Application Ser. No. 61/449,397 entitled "System for Representing Funds" filed Mar. 4, 2011, the contents of which are incorporated by reference herein in their entirety.

BACKGROUND

Description of the Related Art

Virtual goods are non-physical objects purchased for display and interaction. Examples of virtual goods purchased for display include e-cards, and examples of virtual goods purchased for interaction include avatars in online communities or online games. Further examples of virtual goods include weapons sold in virtual games and the sale of real estate in virtual world simulations.

Each day, thousands of transactions take place for virtual goods such as swords, currency, or clothing across a multitude of virtual world environments. For people who purchase virtual items such as swords or armor, buying these items increases the overall satisfaction that the purchaser receives from spending time in a virtual world, online community or online game.

Typical virtual goods allow limited customization from a fixed set of options, such as the color of a fish or the handle of a virtual weapon. These limited customizations accommodate a limited sense of user choice and limited uniqueness of the goods.

SUMMARY

Methods and apparatus for generating a unique virtual item are disclosed. In some embodiments, an encoding specification for a unique virtual item is generated. One or more components of the encoding specification influence appearance properties of the unique virtual item. The generating includes deriving a first set of the one or more components from a plurality of items of personalization information. One or more item characteristics for the unique virtual item are created from the encoding specification. The one or more item characteristics describe a unique feature set for the unique virtual item in terms customized for a type of a rendering client. The creating the one or more item characteristics further comprises selecting based on the one or more components the unique feature set from options offered by a rule set.

Figure 1:
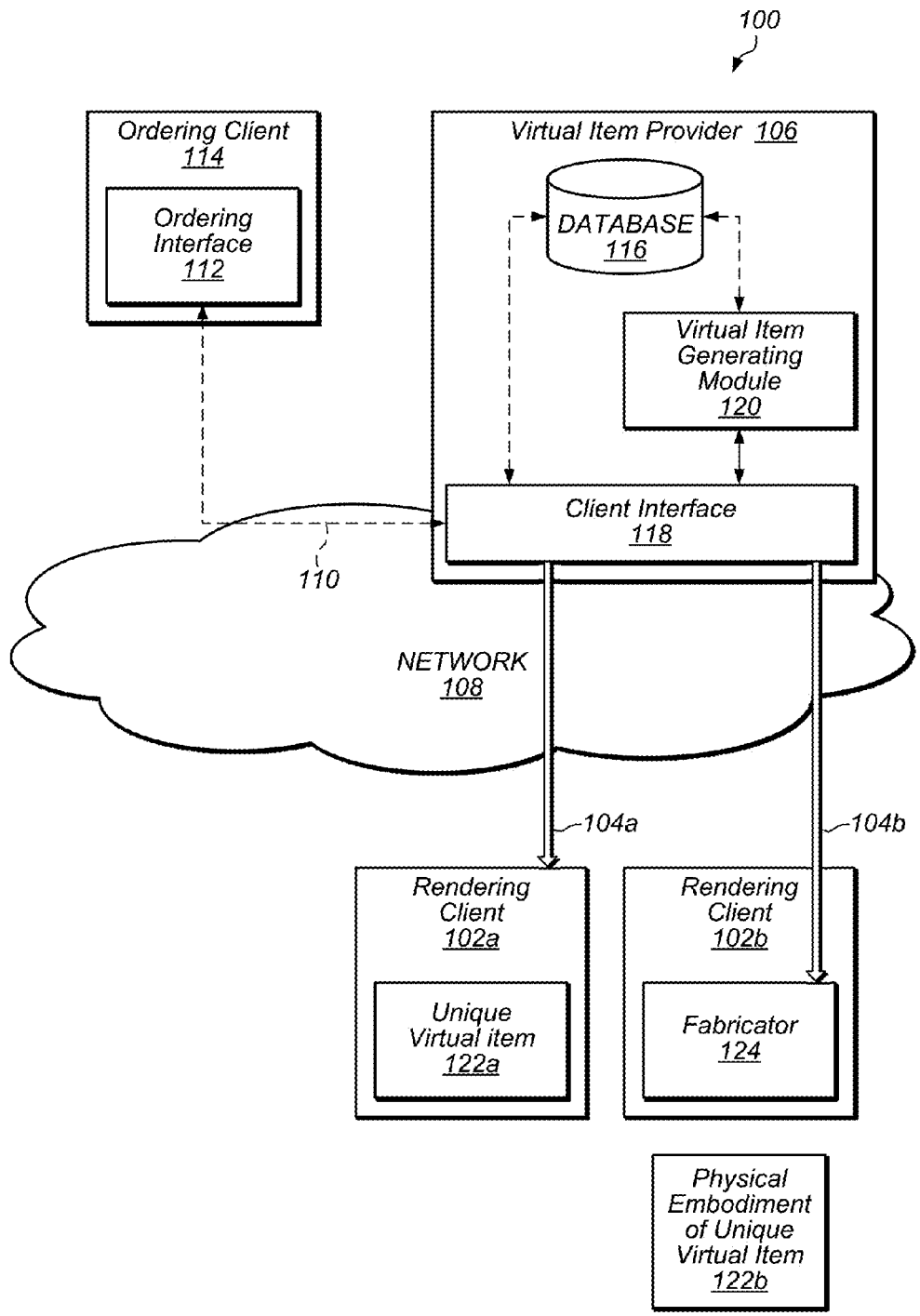
FIG. 1 depicts a distributed system for generating a unique feature set of a virtual item, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. For example, where flowcharts are used below to describe a series of operations that may be performed by embodiments, one of skill in the art will readily realize in light of having read the present disclosure that various operations may be omitted, or other operations may be added, or the order of operations may be varied without departing from the scope and intent of the embodiments presented herein. Likewise, one of skill in the art will readily realize in light of having read the present disclosure that, in diagrams with respect to which software or hardware modules are discussed, that various modules may be omitted, or other modules may be added, or the placement of modules and operations in various systems may be varied from the forms discussed without departing from the scope and intent of the embodiments presented herein.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As used herein, when an operation is described with respect to a single unique virtual item, component, characteristic, or data structure, one of skill in the art will readily realize that the same operation is equally disclosed with respect to a set of multiple unique virtual items, components, characteristics, or data structures.

Terms and Definitions Used in Discussing Generating Unique Virtual Items

As used herein, an "encoding specification" is, unless otherwise noted where used, a data structure including a set of components that influence properties of the unique virtual item. A given encoding specification deterministically yields repeatable values of item characteristics. In some embodiments, an encoding specification is as simple as a string of a fixed number of bits, in which each bit controls a particular feature. Other embodiments support encoding specifications produced as markup documents in markup languages such as XML or objects in programming languages. In some embodiments, an encoding specification includes values describing sensory, physical and behavioral properties of the unique virtual item.

As used herein, a "unique virtual item" is, unless otherwise noted where used, a product having features customized using a computer-implemented system for unique customization. In some embodiments, the entire unique virtual item is a virtual good, as described above, rendered as a data structure or sensory display. Examples of such unique virtual items include computer graphics, or simulated items that may have display or behavior properties in an interactive space capable of receiving user input, such as a video game or other simulation.

In some embodiments, a unique virtual item may include graphics, as well as animations, specifications of kinesthetic feedback, specifications of smell, taste or sound combinations to be emitted in conjunction with a display, or other attributes associated with a display. In other embodiments, a physical embodiment of a unique virtual item is a physical token or physical item with properties (e.g., display attributes, textures, structure, behaviors, responses to stimuli, sensory attributes such as smell or taste), customized using a computer-implemented system for unique customization. An example of a three-dimensional physical token that is a physical embodiment of a unique virtual item is a robotic device with responses to stimuli that are influenced by components of an encoding specification used to generate item characteristics that specify features of the unique virtual item. In both physical and graphical embodiments, the unique virtual item may be used to communicate messages to an observer or a transaction party, where the messages communicate information that may be encoded as any display or condition intended to have meaning to the observer or transaction party.

As used herein, "components of the encoding specification" are, unless otherwise noted where used, any data set within the encoding specification that can be compared to a rule set to define an item characteristic. In some embodiments, the encoding specification is a unique string of components that may have a granularity as small as a single bit.

As used herein, an "appearance property" is, unless otherwise noted where used, any presentation attribute of a unique virtual item. Examples of appearance properties include both physical and behavioral properties of the unique virtual item. Colors and shapes of the unique virtual item are included as appearance properties. Additionally, behavior of the unique virtual item is, in some embodiments, included as an appearance property of the unique virtual item. For example, in an embodiment including a virtual fish tank simulation, the aggressiveness of a virtual fish toward other virtual fish is an appearance property. Other appearance properties include the fish shape and scale pattern. As another example, in an embodiment of a unique virtual item including a three dimensional rendering of a virtual flower, the rate at which the flower reproduces is an appearance property. Other appearance properties of the virtual flower include the petal shape and color. In an embodiment in which the unique virtual item is a weapon in a video game, the appearance properties include the damage inflicted by the weapon. The appearance properties may also include the frequency with which the weapon requires maintenance.

As used herein, "personalization information" is, unless otherwise noted where used, user input from a request for a virtual item or external information that determines components of an encoding specification used to create item characteristics. Particular sets of personalization information used to define an encoding specification will vary between embodiments and their respective rule sets. Examples of personalization information include items describing at least one or more transaction parties identified in a request for the unique virtual item and one or more configurable feature specifications indicating requested properties of the unique virtual item. Further, personalization information may include a rule set specification in a request for a unique virtual item, with the rule set specification describing the basic pattern or model of the virtual item. In addition to the examples of personalization information discussed above, some embodiments support personalization information drawn environmental information from an environment external to a request for a unique virtual item.

As used herein, a "rule set" is, unless otherwise noted where used, a logical specification of options that allows for correlation of transaction information to a unique feature set of a unique virtual item. In some embodiments, a rule set includes a description of feature options that may be embodied as item characteristics that result from particular values of an encoding specification. In some embodiments, a rule set is an archetype of a particular type of unique virtual item (e.g., a breed of flower or fish, or a type of weapon in a virtual game). A rule set describes how a particular rendering client will render the unique virtual item in response to an encoding specification. For example, some embodiments will support rule sets that allow for a plurality of types of rendering client to generate a unique virtual item, with item characteristics, also called assets, customized for each of the rendering clients. A single encoding specification may, in one embodiment, support two-dimensional rendering patterns in a two-dimensional graphical rendering client, three-dimensional visual textures in a three-dimensional graphical rendering client, and a particular physical feature specification (e.g., a given smoothness value or surface material) in a rendering client including a three-dimensional fabricator). In some embodiments, a variety of rule set is referred to as an archetype for a unique virtual item.

As used herein, a "transaction party" is, unless otherwise noted where used, any person or entity having an identified relationship with a request for a unique virtual item. For example, the term transaction party, in some embodiments, includes a sender or a recipient of a unique virtual item. Additionally, in some embodiments, a transaction party is a party who is neither a sender or recipient of the virtual item, but is instead a person identified with the transaction by virtue of having sponsored or endorsed the virtual item or by virtue of having their personally identifying information used in generating an encoding specification (either with or without their consent). In some embodiments a transaction party may be an expected observer of the unique virtual item. In some embodiments, a sender and a recipient are the same entity.

As used herein, a "request for a unique virtual item" is, unless otherwise noted where used, a user interaction in which a unique virtual item is requested from a unique virtual item provider. In some embodiments, a request for a unique virtual item is a transaction in which an ordering client is used to provide personalization information and a request for creation of the unique virtual item.

As used herein, a "configurable feature specification" is, unless otherwise noted where used, an option selection in a request for a unique virtual item.

As used herein, a "requested property of the unique virtual item" is, unless otherwise noted where used, any feature of the unique virtual item that can be influenced through selection of a configurable feature specification in a request. Examples include texture, color, tendency toward particular responses to stimuli, and emission of smells, sounds, or tastes.

As used herein, an "item characteristic" is, unless otherwise noted where used, a data structure or a set of data structures describing aspects of a feature set of a unique virtual item in terms usable by a rendering client to produce the unique virtual item. In some embodiments, item characteristics are assets used by a rendering engine of a rendering client to generate a unique virtual item with distinctive properties perceptible to an observer's five senses. Item characteristics can include instructions to define creation of any behavioral or sensory property of the unique virtual item corresponding to any one of the observer's five senses. For example, embodiments may create, for use with a simulation interface of a rendering client for interacting with a three-dimensional graphical rendering of the unique virtual item, a set of variable values describing the framework shape of the unique virtual item, the texture and color of various portions of a virtual skin covering the framework, and behavior properties of the unique virtual item, such as its response to stimuli.

As a further example, embodiments may create, for use with a display system of a rendering client for generating a picture of a two-dimensional graphical rendering of the unique virtual item, an outline of a unique virtual item, details of coloration and patterns for portions of the unique virtual item, and animation rules for generating responses to events on the display system.

As used herein, a "unique feature set" is, unless otherwise noted where used, a set of characteristics or features that enable a differentiation between unique virtual items with non-identical encoding specifications.

As used herein, a "rendering client" is, unless otherwise noted where used, a machine or computer program employed to create a unique virtual item from a set of item characteristics. As discussed above, in some embodiments, a rendering client is simulation interface for interacting with a three-dimensional graphical rendering of the unique virtual item. In other embodiments, rendering client is a display for generating a picture of a two-dimensional graphical rendering of the unique virtual item. In still other embodiments, a rendering client is a manufacturing system including a fabricator for creating a physical representation or token of the unique virtual item that embodies attributes or behaviors described by the item characteristics.

As used herein, "deterministically encoding" is, unless otherwise noted where used, using a set of rules to reproducibly generate an expected set of outputs from a set of inputs.

As used herein, an "encoding specification registered as using a rule set" is, unless otherwise noted where used, an encoding specification recorded in a database in such a way as to enable comparison of the encoding specification to any subsequent encoding specification associated with the same rule set as the registered encoding specification.

As used herein, a "non-uniqueness of an encoding specification" is, unless otherwise noted where used, an instance of a proposed encoding specification that is identical to another encoding specification that is based on a same rule set such that the proposed encoding specification would produce a unique virtual item with a feature set that is not distinguishable from an existing unique virtual item.

As used herein, a "uniqueness component of an encoding specification" is, unless otherwise noted where used, a variable or set of variables within an encoding specification that can be incremented to differentiate between a set of encoding specifications.

As used herein, a "sensory property of a unique virtual item" is, unless otherwise noted where used, any feature of a virtual item directly discernable by a human sense or by measurement, even if the property is not discernable by a human sense (e.g., magnetic fields, voltages).

As used herein, "environmental information" is, unless otherwise noted where used, any variable external to a request for a unique virtual item. Examples of environmental information include the time and date, random numbers generated by a virtual item generating provider or a client, and information such as a media access control (MAC) address of an ordering client sending a request for a unique virtual item. For example, a MAC address of a machine sending a request for a unique virtual item may be used as personalization information. A time stamp of a request for a unique virtual item may be used as personalization information. Frequently, environmental information is derived from external information sources. For example, personalization information may be drawn from third party servers. Some embodiments scrape social media profiles of transaction parties on social media systems or record sounds in the environment of an ordering client to generate personalization information for inclusion in request.

As used herein, a "message" is, unless otherwise noted where used, any display, item characteristic or behavior intended to communicate meaning to a receiver of the message. For example, a change of color may be intended to communicate a change of status. As an alternative example, emission of a chemical with a known smell may be intended to communicate a change of status.

As used herein, an "external information source" is, unless otherwise noted where used, a source of data outside of a system for generating a unique virtual item. An example of an external information source is a social media profile of a transaction participant. In some embodiments, in the absence of data from an external information source, a default setting or internal machine-generated setting is used. Some embodiments allow for customization of a unique personal item based on information received from an external information source. In one such example, an embodiment may set the color of a unique virtual item based on the colors of an alma mater of a recipient as extracted from the recipient's social media profile or from the colors used in a website of an affinity party.

As used herein, an "affinity party" is, unless otherwise noted where used, a party indicated by a user as being an inspiration for the unique virtual item or a transaction party that is a sponsor, endorser, or beneficiary of the creation of a unique virtual item.

As used herein, a "game condition stimulus" is, unless otherwise noted where used, a condition of a computer program associated with a unique virtual item. Examples of game condition stimuli include the length of time since a virtual flower has been watered, the interaction of an avatar with a virtual flower, the aggressive behavior of a virtual fish, or any other condition of a simulation associated with a unique virtual item.

As used herein, a "pointer to an electronic commerce transaction" is, unless otherwise noted where used, an instruction or addressing value used to initiate, encourage, or complete a transaction involving the unique virtual item. Examples of pointers to electronic commerce transactions include a uniform resource identifier (URI) associated with a unique virtual item to encourage a deposit of funds to an account associated with the unique virtual item. Examples of pointers to electronic commerce transactions include URIs to encourage purchase of additional unique virtual items. Examples of pointers to electronic commerce transactions further include URIs to encourage transactions to service a unique virtual item (e.g., buying fish food for a tank of virtual fish). Examples of pointers to electronic commerce transactions include URIs to encourage transactions not involving virtual goods, such as credit transactions (e.g. gift card) for an online retailer, or specific items to be shipped upon clicking (e.g. chocolates, books, real flowers, etc). In some embodiments, one embodiment of a pointer to an electronic commerce transaction is facility for a recipient of a unique virtual item to provide physical delivery information to a fulfillment provider without providing that physical delivery information to a sender of a unique virtual item, thereby providing for the ability of a recipient of a unique virtual item to receive a physical item sent at the request of the sender of the unique virtual item without revealing to the sender the physical delivery information.

Introduction to Generating Unique Virtual Items

Embodiments of methods and apparatus for generating a unique virtual item are disclosed. In some embodiments, the unique virtual item is an image of a virtual good. In other embodiments, the unique virtual item is a set of attributes or behaviors of a manufactured physical item. An encoding specification for a unique virtual item is generated. One or more components of the encoding specification influence appearance properties of the unique virtual item. Examples of such appearance properties of the unique virtual item include the coloration of an image of a virtual flower, the behavior properties of an in-game item, such as a weapon in a video game, or the responses exhibited by a code object, such as a code object describing a virtual fish in a fish tank simulator or a code object driving the responses of a robotic fish in a swimming pool. Examples of unique virtual items will vary between embodiments without departing from the scope and intent of the present description.

In some embodiments, generating an encoding specification includes deriving a first set of the one or more components of the encoding specification from personalization information. Examples of personalization information include items describing at least one or more transaction parties identified in a request for the unique virtual item and one or more configurable feature specifications indicating requested properties of the unique virtual item. Further, personalization information may include a rule set specification describing the basic pattern or model of the virtual item.

One or more item characteristics are created for the unique virtual item. The one or more item characteristics describe a unique feature set for the unique virtual item in terms customized for a type of a rendering client selected from a plurality of rendering client types to render the unique virtual item. Examples of rendering clients vary widely between embodiments. In some embodiments, a rendering client is simulation interface for interacting with a three-dimensional graphical rendering of the unique virtual item. In other embodiments, a rendering client is a display for generating a picture of a two-dimensional graphical rendering of the unique virtual item. In still other embodiments, a rendering client is manufacturing system for creating a physical representation or token of the unique virtual item that embodies attributes or behaviors described by the item characteristics.

In some embodiments, the type of rendering client will influence the types of item characteristics created. For example, embodiments may create, for use with a simulation interface for interacting with a three-dimensional graphical rendering of the unique virtual item, a set of variable values describing the framework shape of the unique virtual item, the texture and color of various portions of a virtual skin covering the framework, and behavior properties of the unique virtual item, such as its response to stimuli. As a further example, embodiments may create, for use with a display system for generating a picture of a two-dimensional graphical rendering of the unique virtual item, an outline of a unique virtual item, details of coloration and patterns for portions of the unique virtual item, and animation rules for generating responses to events on the display system. In some embodiments, creating the one or more item characteristics further includes selecting based on the one or more components the unique feature set from options offered by a rule set specified in a rule set selection. In some embodiments, the one or more item characteristics are sent to the rendering client.

Some embodiments may include a means for creating a unique virtual item with a unique feature driven by a unique encoding specification. For example, a virtual item generating module, as described below, may receive input identifying a rule set selection, customization options in the form of configurable feature specifications, and identifying information related to transaction parties associated with a request for a unique virtual item, as described herein. The virtual item generating module may generate encoding specifications, and create item characteristics, as described below. The virtual item generating module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying the rule set selection, customization options in the form of configurable feature specifications, and identifying information related to transaction parties associated with a request for a unique virtual item, as described herein. The computer-readable storage medium may store program instructions executable by the one or more processors to cause the computing apparatus to perform generating encoding specifications, and create item characteristics, as described below.

Systems and Modules for Generating Unique Virtual Items

FIG. 1 depicts a distributed system for generating a unique feature set of a virtual item, according to one embodiment. One embodiment of a unique virtual item system 100 includes rendering clients 102a-102b receiving item characteristics 104a-104b from a virtual item provider 106 across a network 108 in response to requests 110 from an ordering client 114. While a pair of rendering clients 102a-102b and a single one of each of ordering client 114 and virtual item provider 106 are portrayed in FIG. 1, one of skill in the art will readily realize, in light of having read the present disclosure, that embodiments including larger numbers of rendering clients 102, ordering clients 114, and virtual item providers 106 are contemplated by the present disclosure and are within the scope and intent of the embodiments disclosed herein. Further, in some embodiments, components of virtual item provider 106 may be distributed across multiple computing systems. Additionally, while each of rendering clients 102a-102b and a single one of each of ordering client 114 and virtual item provider 106 are portrayed in FIG. 1 are portrayed in FIG. 1 as residing on separate computing systems, one of skill in the art will readily realize in light of having read the present disclosure that various embodiments will combine one or more of rendering clients 102a-102b and a single one of each of ordering client 114 and virtual item provider 106 (or their components) without departing from the scope and intent of the embodiments disclosed herein.

In some embodiments, a rendering client 102 is a machine or computer program employed to create a unique virtual item 122 from a set of item characteristics 104. As discussed above, in some embodiments, a rendering client 102a is simulation interface for interacting with a three-dimensional graphical rendering of the unique virtual item 122a. In other embodiments, rendering client 102a is a display for generating a picture of a two-dimensional graphical rendering of the unique virtual item 122a. In still other embodiments, a rendering client 102b is manufacturing system including a fabricator 124 for creating a physical representation or token of the unique virtual item that embodies attributes or behaviors described by the item characteristics 104. Examples of fabricator 124 include three-dimensional printers and mechanical lathes. In some embodiments, a virtual item provider 106 is a system or systems configured to translate requests 110 for virtual items into item characteristics 104.

In some embodiments, item characteristics 104 are defined to mean a data structure or data structures describing aspects of a feature set of a unique virtual item in terms usable by a rendering client 102 to produce the unique virtual item 122. Examples of item characteristics 104 are described above. In some embodiments, item characteristics 104 are assets used by a rendering engine of a rendering client 102 to generate a unique virtual item 122 with distinctive properties perceptible to an observer's five senses. Item characteristics 104 can include instructions to define creation of any behavioral or sensory property of the unique virtual item 122 corresponding to any one of the observer's five senses. For example, embodiments may create, for use with a simulation interface of a rendering client 102 for interacting with a 3-dimensional graphical rendering of the unique virtual item 122, a set of variable values describing the framework shape of the unique virtual item 122, the texture and color of various portions of a virtual skin covering the framework, and behavior properties of the unique virtual item 122, such as its response to stimuli.

As a further example, embodiments may create, for use with a display system of a rendering client 102a for generating a picture of a two-dimensional graphical rendering of the unique virtual item 122a, an outline of a unique virtual item 122a, details of coloration and patterns for portions of the unique virtual item 122a, and animation rules for generating responses to events on the display system. A sensory property of a unique virtual item 122 may include any feature of a virtual item 122 directly discernable by a human sense or by measurement, even if the property is not discernable by a human sense (e.g., magnetic fields, voltages).

Network 108 may include any channel for providing effective communication between each of the entities of unique virtual item system 100. In some embodiments, network 108 includes an electronic communication network, such as the internet, a local area network (LAN), a cellular communications network, or the like. Network 108 may include a single network or combination of networks that facilitate communication between each of the entities (e.g., rendering clients 102a and 102b, ordering client 114 and virtual item provider 106) of system 100.

In some embodiments, a request 110 for a unique virtual item 122 is a user interaction in which a unique virtual item 122 is requested from a unique virtual item provider 106. In some embodiments, a request 110 for a unique virtual item 122 is a transaction in which an ordering client 114 is used to provide personalization information and a request for creation of the unique virtual item.

In some embodiments, personalization information is user input from a request 110 for a virtual item or external information that determines components of an encoding specification used to create item characteristics 104. Particular sets of personalization information used to define an encoding specification will vary between embodiments and their respective rule sets. As discussed above, examples of personalization information include items describing at least one or more transaction parties identified in a request 110 for the unique virtual item 122 and one or more configurable feature specifications indicating requested properties of the unique virtual item 122. Further, personalization information may include a rule set specification in a request 110 describing the basic pattern or model of the unique virtual item 122. In addition to the examples of personalization information discussed above, some embodiments support personalization information derived from environmental information, for example from an environment external to a request 110 for a unique virtual item 122. Thus, in some embodiments, personalization information is personal information used to seed variability in three-dimensional graphics for the purpose of creating personalized unique virtual items including unique visuals (graphics, simulation and/or animation), abilities, and personality, which can be sold as individual products or used to add value to an existing product (e.g., a personalized light emitting diode display embedded within the shell of a consumer product).

In some embodiments, environmental information is any variable external to a request 110 for a unique virtual item 122. Examples of environmental information include the time and date, random numbers generated by virtual item generating module 120, and information such as a media access control (MAC) address of an ordering client 114 sending a request 110 for a unique virtual item 122. For example, a MAC address of a machine sending a request for a unique virtual item 122 may be used as personalization information. A time stamp of request 110 may be used as personalization information. Frequently, environmental information is derived from external information sources. For example, personalization information may be drawn from third party servers (not shown). Some embodiments scrape social media profiles of transaction parties on social media systems (not shown) or capture (by causing an ordering client 114 to record) sounds in the environment of an ordering client 114 to generate personalization information for inclusion in request 110.

In some embodiments, an external information source is a source of data outside of a system for generating a unique virtual item. An example of an external information source is a social media profile of a transaction participant. In some embodiments, in the absence of data from an external information source, a default setting or internal machine-generated setting is used. Some embodiments allow for customization of a unique personal item 122 based on information received from an external information source. In one such example, an embodiment may set the color of a unique virtual item based on the colors of an alma mater of a recipient as extracted from the recipient's social media profile or from the colors used in a website of an affinity party.

In some embodiments, a requested property of the unique virtual item 122 is any feature of the unique virtual item 122 that can be influenced through selection of a configurable feature specification in a request 110. Examples include texture, color, tendency toward particular responses to stimuli, and emission of smells, sounds, or tastes.

Example operations of ordering client 114 are discussed below with respect to FIG. 8. An example user interface implemented by ordering interface 112 are discussed below with respect to FIGS. 9A-9F. In the embodiment shown in FIG. 1, virtual item provider includes a database 116, a client interface 118 for interacting with an ordering client 114 and a rendering client 102, and a virtual item generating module 120.

In some embodiments, rendering client 102a is configured to directly render and display a unique virtual item 122a, such as a graphical display of a unique virtual item. In some embodiments, rendering client 102b includes a fabricator 124 for creating a physical embodiment of a unique virtual item 122b. In some embodiments, a unique virtual item 122 is a product having features customized using a computer-implemented system for unique customization. In some embodiments, the entire unique virtual item 122a is a virtual good, as described above, rendered as a data structure or sensory display. Examples of such unique virtual items include computer graphics, or simulated items that may have both display and behavior properties in an interactive space capable of receiving user input, such as a video game or other simulation. In some embodiments, a unique virtual item 122 may include graphics, as described above, as well as animations, specifications of kinesthetic feedback, specifications of smell, taste or sound combinations to be emitted in conjunction with a display, or other attributes associated with a display. In other embodiments, a physical embodiment of a unique virtual item 122b is a physical token or physical item with properties, (e.g., display attributes, textures, structure, behaviors, responses to stimuli, smell or taste) customized using a computer-implemented system for unique customization. An example of a three-dimensional physical token that is a physical embodiment of a unique virtual item 122b is a robotic device with responses to stimuli that are influenced by components of an encoding specification used to generate item characteristics that specify features of the unique virtual item. In both physical and graphical embodiments, the unique virtual item 122 may be used to communicate messages to an observer or a transaction party, where the messages communicate information that may be encoded as any display or condition intended to have meaning to the observer or transaction party.

Figure 2A:
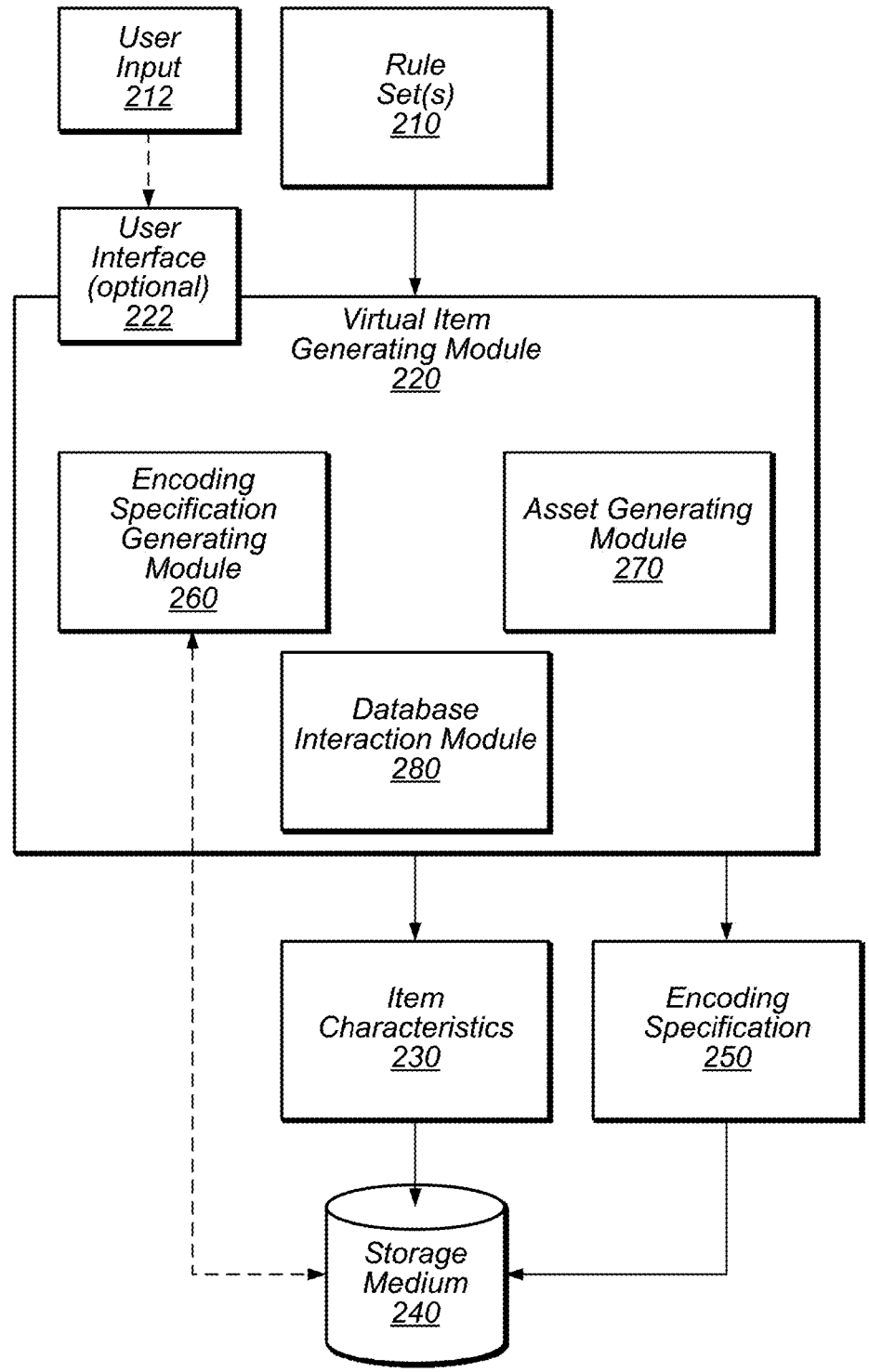
FIG. 2A illustrates a module that may implement generating a unique feature set of a virtual item, according to some embodiments.
Figure 10:
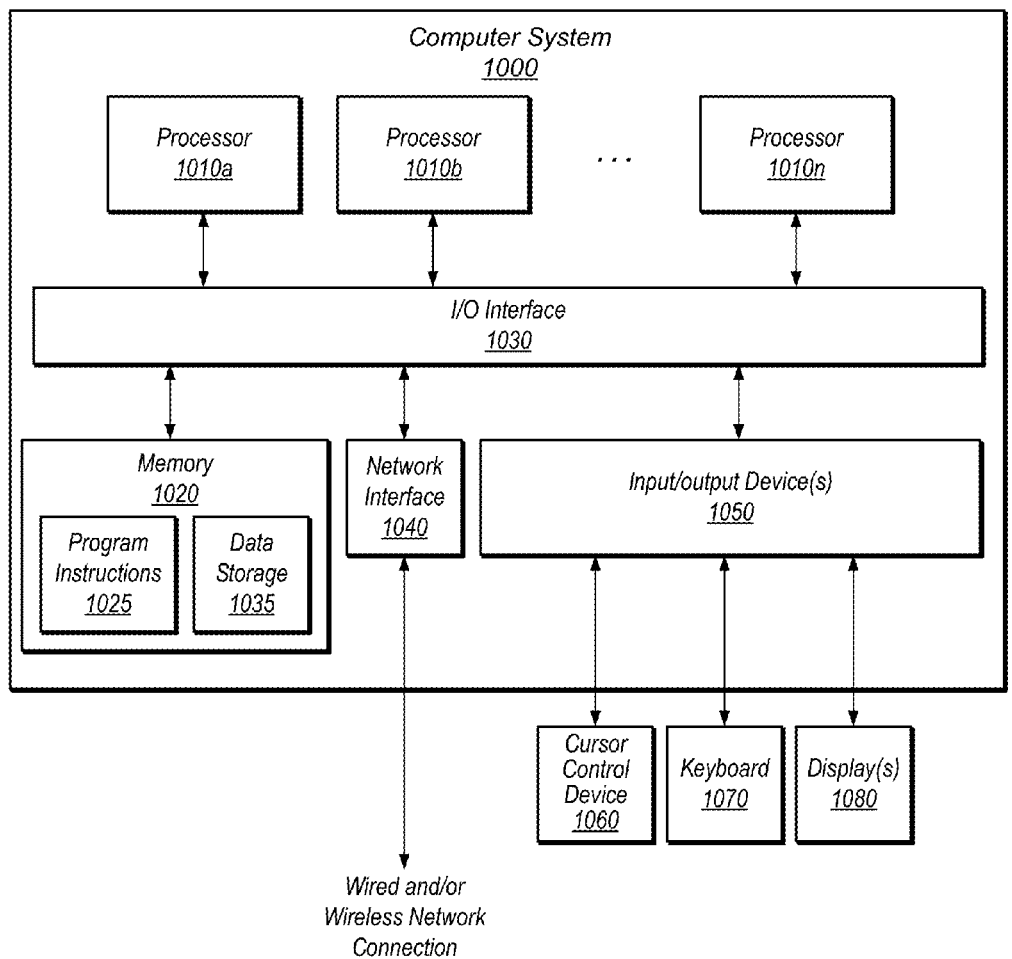
FIG. 10 illustrates an example computer system that may be used in embodiments.

FIG. 2A illustrates a module that may implement generating a unique feature set for a virtual item, according to some embodiments. A virtual item generating module 220 may implement the virtual item generating techniques discussed below with respect to FIGS. 3-6. Virtual item generating module 220 may, for example, include one or more of an encoding specification generating module 260, a database interaction module 280, and an item characteristic generating module 270. FIG. 10 illustrates an example computer system on which embodiments of virtual item generating module 220 may be implemented. Virtual item generating module 220 receives as input one or more rule sets 210.

A rule set 210 is a logical specification of options that allows for correlation of transaction information to a unique feature set of a unique virtual item. In some embodiments, a rule set 210 is a description of feature options that may be embodied as item characteristics 230 resulting from particular values of an encoding specification 250. In some embodiments, a rule set 210 is an archetype of a particular type of unique virtual item (e.g., a breed of flower or fish, or a type of weapon in a virtual game). Rule set 210 describes how a particular rendering client will render the unique virtual item in response to an encoding specification 250. For example, some embodiments will support rule sets 210 that allow for a plurality of types of rendering client to generate a unique virtual item, with item characteristics, also called assets, customized for each of the rendering clients. A single encoding specification 250 may, in one embodiment, support two-dimensional rendering patterns in a two-dimensional graphical rendering client, three-dimensional visual textures in a three-dimensional graphical rendering client, and a particular physical feature specification (e.g., a given smoothness value or surface material) in a rendering client including a three-dimensional fabricator). In some embodiments, a variety of rule set 210 is referred to as an archetype for a unique virtual item.

Encoding specification generating module 260 generates an encoding specification 250 from user input 212, which may be received from an ordering client (not shown) as a request (e.g., see request 110 of FIG. 1) through a client interface (not shown), or, in some embodiments, through an optional integrated user interface 222. In some embodiments, an encoding specification 250 is a data structure including a unique set of components that influence properties of the unique virtual item. A given encoding specification deterministically yields repeatable values of the item characteristics 230. An encoding specification 250 may be as simple as a string of a fixed number of bits, in which each bit controls a particular feature. Other embodiments support encoding specifications 250 produced in markup languages such as XML. Encoding specification 250 may include values representing sensory, physical and behavioral properties of the unique virtual item.

In some embodiments, components of the encoding specification 250 are any data set within the encoding specification 250 that can be compared to a rule set 210 to define an item characteristic 230. In some embodiments, the encoding specification 250 is a unique string of components that may have a granularity as small as a single bit. A single encoding specification 250 may lead to different item characteristics 230, depending on the rendering client for which the item characteristics 230 are generated from the encoding specification. Thus, a form of digital rights management is provided by specifying item characteristics 230 available from a particular encoding specification on a particular client. In one example, a unique virtual item can be rendered on any or all of a set of possible rendering clients. Item characteristics 230 vary between rendering clients based on both rendering client capabilities and privilege choices related to users of the rendering client. For example, a unique virtual item with sexually suggestive features may—by sender's choice—not be rendered on a smart phone or cannot be forwarded or seen by persons other than the intended user. In one embodiment, an encoding specification 250 includes settings for privacy controlling item characteristics 230 related to management of display rights.

Examples of such transaction information include personalization information, as defined above, from a user, selections of configurable feature specifications, and environmental information. In some embodiments, a configurable feature specification is an option selection in a request for a unique virtual item. In some embodiments, transaction information includes transaction parties. In some embodiments, a transaction party is any person or entity having an identified relationship with a request for a unique virtual item. For example, the term transaction party may include a sender or a recipient of a unique virtual item. Additionally, in some embodiments, a transaction party may be a party who is neither a sender or recipient of the virtual item, but is instead a person identified with the transaction by virtue of having sponsored or endorsed the virtual item or by virtue of having their personally identifying information used in generating an encoding specification (either with or without their consent). In some embodiments a transaction party may be an expected observer of the unique virtual item. In some embodiments, a sender and a recipient are the same entity. In some embodiments, an affinity party is one of the available transaction parties. An affinity party is a party indicated by a user as being an inspiration for the unique virtual item or may mean a transaction party that is a sponsor, endorser, or beneficiary of the creation of a unique virtual item. In some embodiments, a virtual item may be configured to provide a pointer to an electronic commerce transaction.

In some embodiments, a pointer to an electronic commerce transaction is an instruction or addressing value used to initiate, encourage, or complete a transaction involving the unique virtual item. Examples of pointers to electronic commerce transactions include a uniform resource identifier (URI) associated with a unique virtual item to encourage a deposit of funds to an account associated with the unique virtual item. Examples of pointers to electronic commerce transactions include URIs to encourage purchase of additional unique virtual items. Examples of pointers to electronic commerce transactions include URIs to encourage transactions to service a unique virtual item (e.g., buying fish food for a tank of virtual fish). Examples of pointers to electronic commerce transactions include URIs to encourage transactions not involving virtual goods, such as credit transactions (e.g., gift card) for an online retailer, specific items to be shipped upon clicking (e.g., chocolates, books, real flowers, etc).

Rule set 210 is used in selecting one or more components of the unique feature set from options offered by a rule set 210. In some embodiments, virtual item generating module 220 may receive user input 212, such as personalization information from a user and selections of configurable feature specifications directly through a user interface 222. Referring briefly to FIG. 1, in some embodiments, personalization information from a user and selections of configurable feature specifications may instead be received from a client interface 118 interacting with a remote ordering client 114.

Returning to FIG. 2A, virtual item generating module 220 then generates an encoding specification 250 using encoding specification generating module 260 by deriving components of the encoding specification from personalization information, selections of configurable feature specifications, and environmental information. Examples of environmental information include the time and date, random numbers generated by virtual item generating module, and information such as a MAC address of a client sending a request for a unique virtual item. Encoding specification 250 influences appearance properties of a unique virtual item generated from the encoding specification.

In some embodiments, appearance properties include any presentation attribute of a unique virtual item. Examples of appearance include both physical and behavioral properties of the unique virtual item. Colors and shapes of the unique virtual item are included as appearance properties. Additionally, behavior of the virtual item is, in some embodiments, included as an appearance property of the virtual item. For example, in an embodiment including a virtual fish tank simulation, the aggressiveness of a virtual fish toward other virtual fish is an appearance property. Other appearance properties include the fish shape and scale pattern. As another example, in an embodiment including a three dimensional rendering of a virtual flower, the rate at which the flower reproduces is an appearance property. Other appearance properties of the virtual flower include the petal shape and color. In an embodiment in which the unique virtual item is a weapon in a video game, the appearance properties include the damage inflicted by the weapon. The appearance properties may also include the frequency with which the weapon requires maintenance.

In some embodiments, virtual item generating module 220 then creates item characteristics 230 using item characteristic generating module 270 by selecting one or more components of the unique feature set to be embodied as item characteristics 230 from options offered by a rule set. In some embodiments, a unique feature set is a set of characteristics or features that enable a differentiation between to unique virtual items with non-identical encoding specifications. The item characteristics describe the unique feature set for the unique virtual item in terms customized for a type of a rendering client. Virtual item generating module 220 will, in some embodiments, use a database interaction module 240 to store both item characteristics 230 and encoding specification 250 to a storage medium 240, such as a database.

In some embodiments, database interaction module 280 is also used during the process of generating an encoding specification 250 to ensure uniqueness of an encoding specification. Specifically, in some embodiments, encoding specification generating module 260 deterministically encodes the plurality of items of the personalization information as the one or more components of the encoding specification 250. In some embodiments, deterministically encoding is using a set of rules to reproducibly generate an expected set of outputs from a set of inputs.

Database interaction module compares the one or more components of the encoding specification 250 to a set of encoding specifications registered as also using the rule set in storage medium 240. In some embodiments, an encoding specification registered as using a rule is an encoding specification recorded in a database in such a way as to enable comparison of the encoding specification to any subsequent encoding specification associated with the same rule set as the registered encoding specification. Responsive to discovering a non-uniqueness of encoding specification 250, encoding specification generating module 260 alters a uniqueness component of the encoding specification 250. In some embodiments, a non-uniqueness of an encoding specification is an instance of a proposed encoding specification that is identical to another encoding specification on a same rule set such that the proposed encoding specification would produce a unique virtual item with a feature set that is not distinguishable from an existing unique virtual item. In some embodiments, a uniqueness component of an encoding specification is a variable or set of variables within an encoding specification that can be incremented to differentiate between a set of encoding specifications.

In some embodiments, virtual item generating module 220 will further send item characteristics 230 to a rendering client, such as rendering clients 102a-102b, discussed above with respect to FIG. 1. Both item characteristics 230 and encoding specification 250 may, for example, be stored to a storage medium 240, such as system memory, a disk drive, DVD, CD, etc.

Figure 2B:
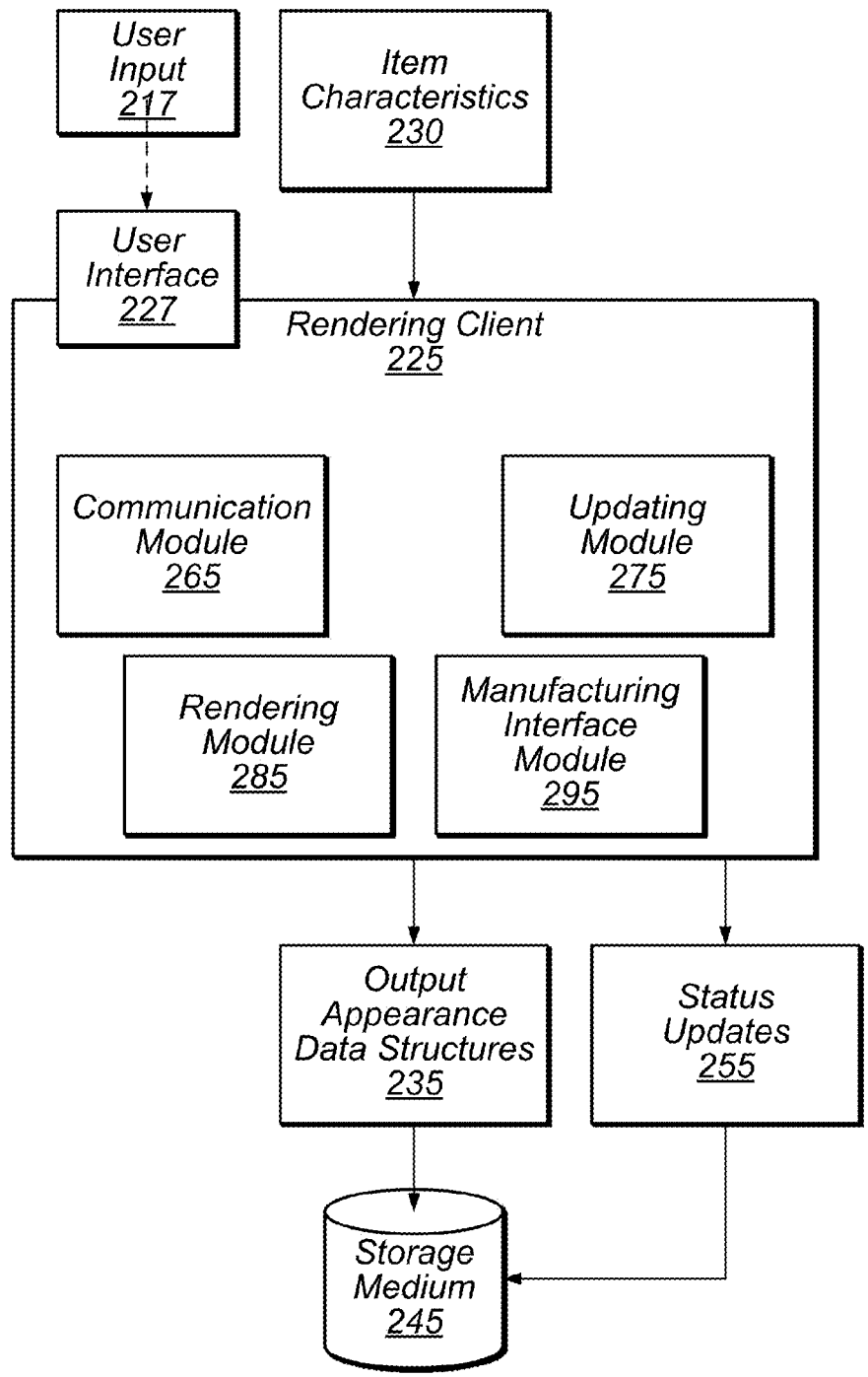
FIG. 2B depicts a module that may implement rendering a virtual item with a unique feature set, according to some embodiments.

FIG. 2B depicts a module that may implement rendering a virtual item with a unique feature set, according to some embodiments. A rendering client 225 receives item characteristics 230 through communication with a database (not shown) using a communication module 265. Rendering client 225 may implement one or more of the techniques associated with generating a unique virtual item as discussed below and illustrated in FIG. 8. In some embodiments, rendering client 225 is simulation interface allowing a user to interact with a three-dimensional graphical rendering of the unique virtual item through user input 217 supplied to a user interface 227. In other embodiments, rendering client 225 is a display for generating a picture of a two-dimensional graphical rendering of the unique virtual item. In still other embodiments, rendering client is manufacturing system for creating a physical representation or token of the unique virtual item that embodies attributes or behaviors described by the item characteristics through a manufacturing interface module 295 communicating with a fabrication tool (not shown), such as a three-dimensional printer, two-dimensional printer, casting system, engraver or a lathe.

Rendering client 225 generates output appearance data structures 235 that will vary between embodiments of rendering client 225. For example, in embodiments configured to generate a graphical display, output appearance data structures 235 may take the form of instructions to a graphical display for rendering an image, which may be either two-dimensional or three-dimensional. Such instructions may be generated by a rendering module 285. In some embodiments, rendering client 225 may operate as a freestanding application or as a plug-in module for a virtual world interface or other simulation, or as an in-line plug-in for a browser such as a web browser. Similarly, in embodiments configured to generate a physical embodiment of a unique virtual item through a manufacturing interface module 295 communicating with a fabrication tool (not shown), output appearance data structures 235 may include commands for depositing or removing physical material.

Additionally, rendering client 225 may include an updating module 275 for creating status updates 255. Status updates 255 include changes to a state, attribute or status of a unique virtual item. In some embodiments, status updates 255 are the result of user input 217, such as interaction with a game simulation hosting a virtual item to communicate a game condition stimulus, through user interface 227. Other game condition stimuli may be generated by a rendering client 225, where the rendering client 225 is a simulation or game environment hosting the unique virtual item. In some embodiments, a game condition stimulus is a condition of a computer program associated with a unique virtual item. Example of game condition stimuli include the length of time since a virtual flower has been watered, the interaction of an avatar with a virtual flower, the aggressive behavior of a virtual fish, or any other condition of a simulation associated with a unique virtual item.

In some such embodiments, status updates result in rendering module 285 generating new output appearance data structures 235 for graphical display. In other embodiments, such as where a unique virtual item is physically embodied, status updates are communicated to a physical embodiment of the unique virtual item as instructions to change an appearance of the unique virtual item. Frequently, such appearance changes are used to communicate a message to an observer of the unique virtual item.

In some embodiments, a message is any display, item characteristic or behavior intended to communicate meaning to a receiver of the message. For example, a change of color may be intended to communicate a change of status. As an alternative example, emission of a chemical with a known smell may be intended to communicate a change of status. Output appearance data structures 235 and status updates 255 may be stored to a storage medium 245, such as system memory, a disk drive, DVD, CD, etc.

Figure 2C:
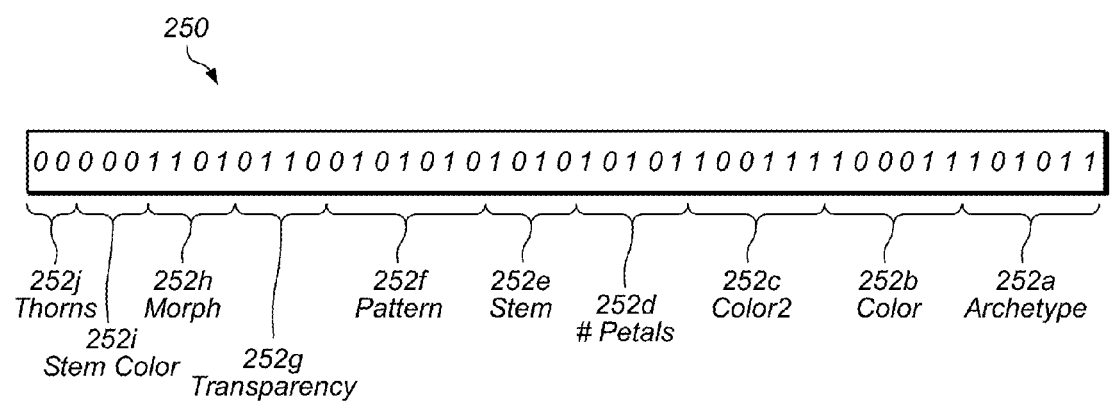
FIG. 2C depicts an encoding specification that may be used with one embodiment.

FIG. 2C depicts an encoding specification that may be used with one embodiment. The operations described below with respect to generating a unique virtual item are discussed with respect to an encoding specification 250, which can take the form a series of bits of sufficient length to contain the necessary variability, or it could be a structure ("struct" in C language would be an example). Components 252a-252j control various properties of a unique virtual item. For sake of clarity and conformance with the example portrayed below with respect to FIGS. 9A-9F, components 252a-252j encode visual properties of a graphical rendering of a virtual flower. One of skill in the art, however, will realize in light of having read the present disclosure that the principles discussed herein with respect to encoding specification 250 apply equally to other encoding specifications for other unique virtual items (e.g., weapons, fish, display characteristics of a manufactured token representing a virtual good) as well as to other sensory properties (smells emitted, behaviors, etc.).

A first component 252a controls a rule set used to generate a unique virtual item (called here an archetype). A second component 252b controls a primary color of the unique virtual item. A third component 252c controls a secondary color of the unique virtual item. A fourth component 252d controls a primary structural feature (# of petals) of the unique virtual item. A fifth component 252e controls a secondary structural feature (stem shape) of the unique virtual item. A sixth component 252f controls a surface feature (surface pattern) of the unique virtual item. A seventh component 252g controls a first interactive feature (transparency for viewing in a virtual world simulation) of the unique virtual item. An eighth component 252g controls a second interactive feature (physical morphability) of the unique virtual item. A ninth component 252h controls a third (stem) color of the unique virtual item. A tenth component 252j controls a third structural feature (thorns) of the unique virtual item. While a total of ten components are described with respect FIG. 2C, one of skill in the art will readily realize in view of having read the present specification that differing numbers of components may be used in varying embodiments without departing from the scope and intent of this disclosure. While components 252a-252j are based on continuous strings of bits, some embodiments will support control of features through discontinuous bits.

In some embodiments, components 252a-252j are derived from alphanumeric values of personalization information, such as strings of personalization information that can be entered in an interface, an example of which is discussed below with respect to FIG. 9B. In some embodiments, strings may be converted into components 252b-252j by means of hashing. Likewise, numerical values may be converted into components 252b-252j by means of an XOR operation. A digital representation of a photograph of a transaction party may be accepted by some embodiments of the present invention and hashed to generate components 252a-252j, as can an audio recording of a transaction party or sponsor. In some embodiments, a sample of biological tissue may be sequenced to derive DNA values that can then be used to control components 252a-252j. In some embodiments, components 252b-252j are used for selecting the one or more components of the unique feature set from options offered by a rule set specified by component 252a.

Operations Usable in Generating Unique Virtual Items

Figure 3:
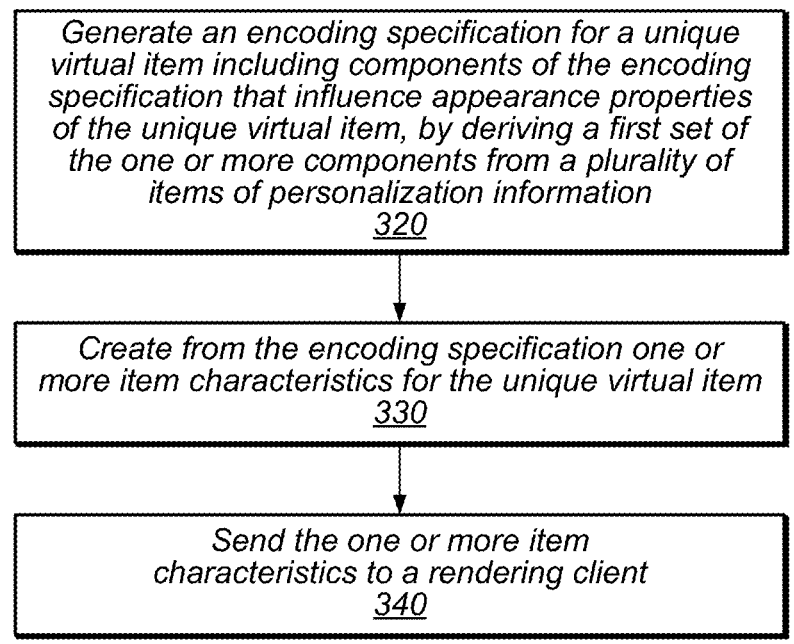
FIG. 3 illustrates a high-level logical flowchart of a process for generating a unique feature set of a virtual item, according to one embodiment.

FIG. 3 illustrates a high-level logical flowchart of a process for generating a unique feature set of a unique virtual item, according to one embodiment. An example of a system capable of executing the operations described below with respect to FIG. 3 is virtual item generating module 120 of FIG. 1, described above. In some embodiments, the process described below with respect to FIG. 3 enables use of information that is unique to individual users or individual devices as input to a procedure which will output selected graphical features of a unique virtual object, character, or thing or the environment which surrounds that object, character, or thing, or the conditions that are found inside that environment.

An encoding specification for a unique virtual item, including components of the encoding specification that influence appearance properties of the unique virtual item, is generated by deriving a first set of the one or more components from a plurality of items of personalization information (block 320). Referring briefly to FIG. 2, personalization information may be received as user input 212 through a user interface in some embodiments. Referring briefly to FIG. 1, personalization information may be received in a request 110. One or more item characteristics are created for the unique virtual item (block 330). Returning to FIG. 3, in some embodiments, item characteristics are created by comparing a rule set to the encoding specification and selecting an option for an item characteristic from a set of options listed in the rule set based on the value of the component of the encoding specification. The one or more item characteristics are sent to a rendering client (block 340).

Figure 4:
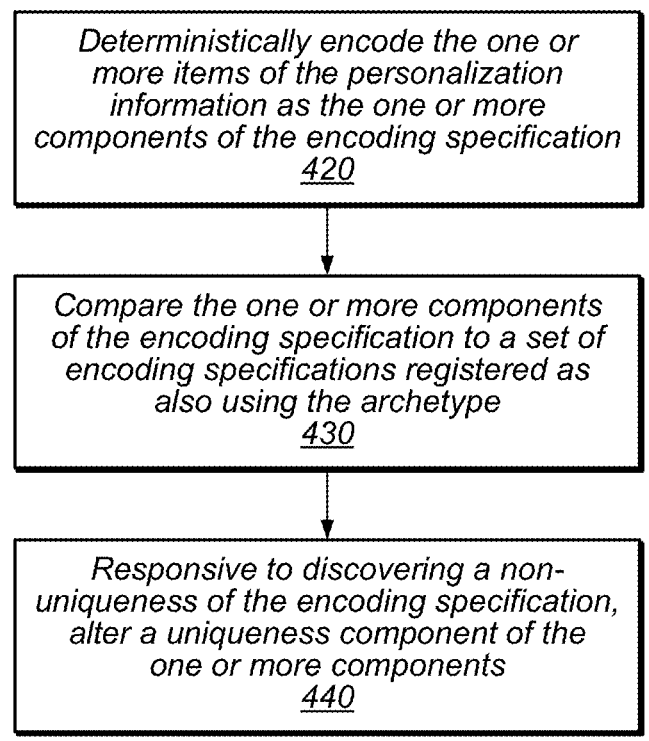
FIG. 4 depicts a high-level logical flowchart of a process for generating an encoding specification for a unique feature set of a virtual item, according to one embodiment.

FIG. 4 depicts a high-level logical flowchart of a process for generating an encoding specification for a unique feature set of a virtual item, according to one embodiment. The one or more items of the personalization information are deterministically encoded as the one or more components of the encoding specification (block 420). In one embodiment, deterministically encoding is performed by generating numerical values for the encoding specification by performing repeatable mathematical operations on the personalization information, such as by hashing a string value. The one or more components of the encoding specification are compared to a set of encoding specifications registered as also using the archetype (block 430). Responsive to discovering a non-uniqueness of the encoding specification, a uniqueness component of the one or more components is altered (block 440).

Figure 5:
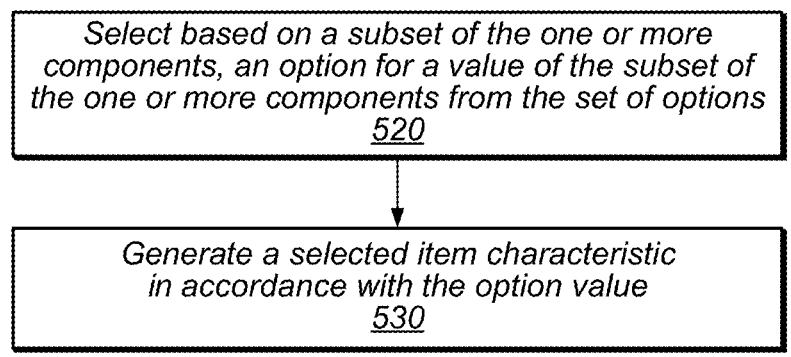
FIG. 5 illustrates a high-level logical flowchart of a process for generating item characteristics from an encoding specification for a unique feature set of a virtual item, according to one embodiment.

FIG. 5 illustrates a high-level logical flowchart of a process for generating item characteristics from an encoding specification for a unique feature set of a virtual item, according to one embodiment. Based on a subset of the one or more components, an option for a value of the one or more components is selected from the set of options (block 520). A selected item characteristic is generated in accordance with the option value (block 530).

Figure 6:
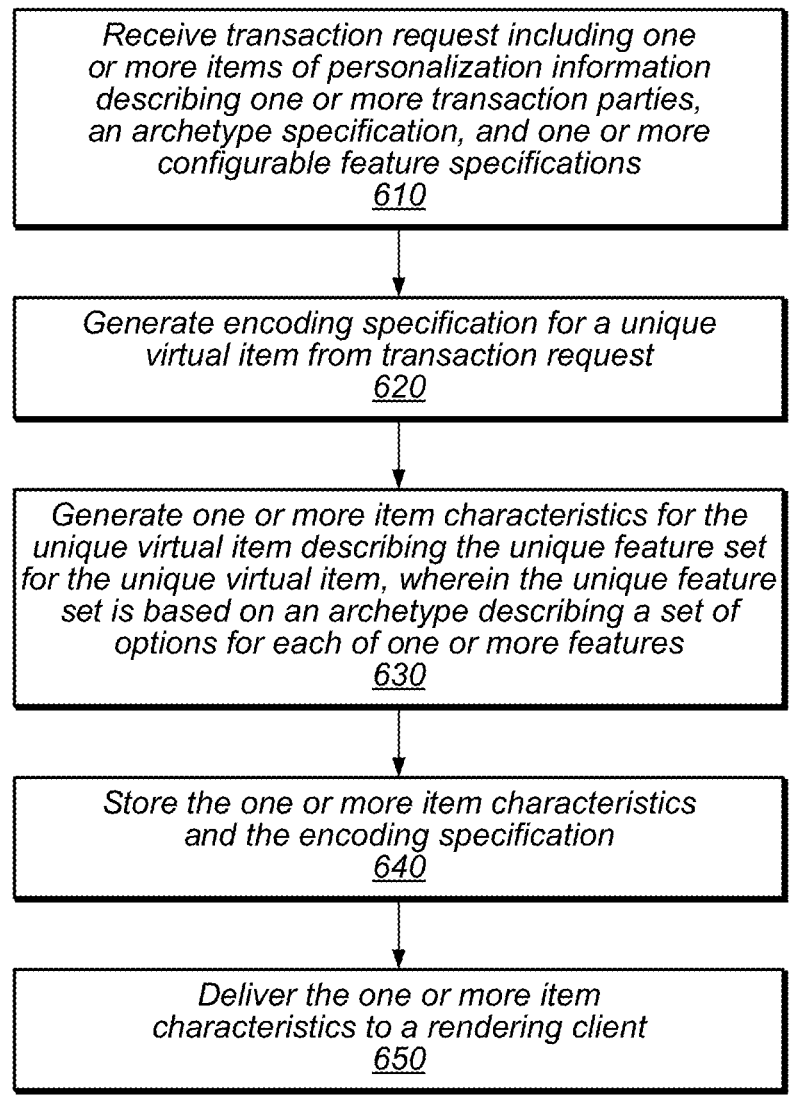
FIG. 6 depicts a high-level logical flowchart of a process for generating a unique feature set of a virtual item, according to one embodiment.

FIG. 6 depicts a high-level logical flowchart of a process for generating a unique feature set of a virtual item, according to one embodiment. A transaction request with one or more items of personalization information describing one or more transaction parties, an archetype specification, or one or more configurable feature specifications (block 610) is received. An encoding specification for a unique virtual item is generated from the transaction request (block 620). Item characteristics are generated for the unique virtual item, describing the unique feature set for the unique virtual item, wherein the unique feature set is based on an archetype describing a set of options for each of one or more features (block 630). The item characteristics and the encoding specification are stored (block 640). The item characteristics are delivered to a rendering client (block 650).

Figure 7:
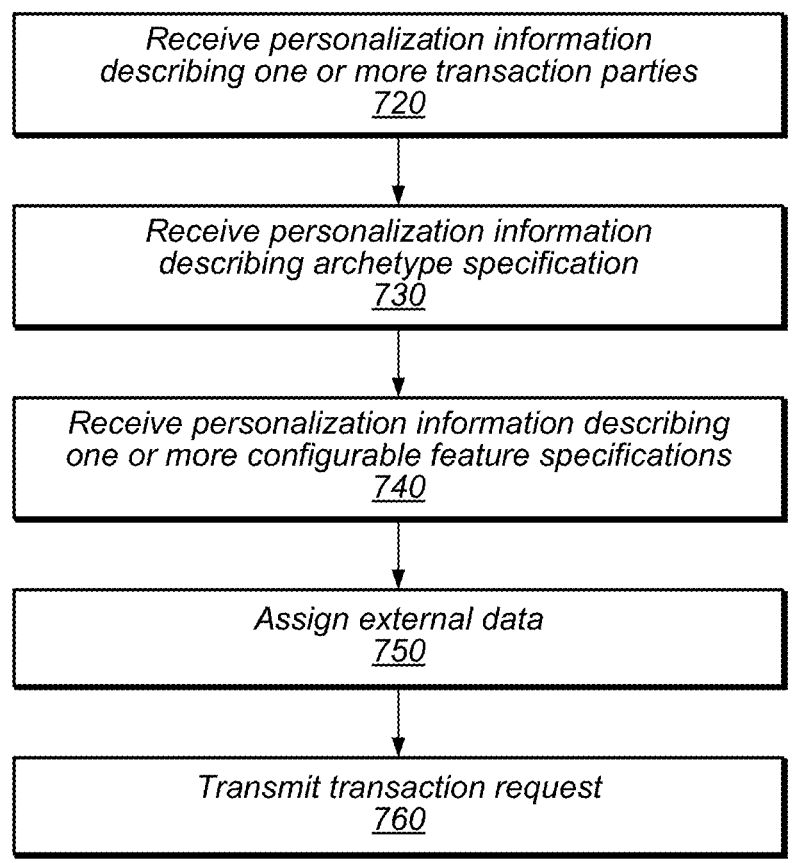
FIG. 7 illustrates a high-level logical flowchart of a process for generating a transaction request for a unique feature set of a unique virtual item, according to one embodiment.

FIG. 7 illustrates a high-level logical flowchart of a process for generating a transaction request for a unique feature set of a unique virtual item, according to one embodiment. Personalization information describing one or more transaction parties is received (block 720). Personalization information describing an archetype specification is received (block 730). Personalization information describing one or more feature specifications is received (block 740). External data is assigned (block 750), such as environmental data. A transaction request is transmitted (block 760).

Figure 8:
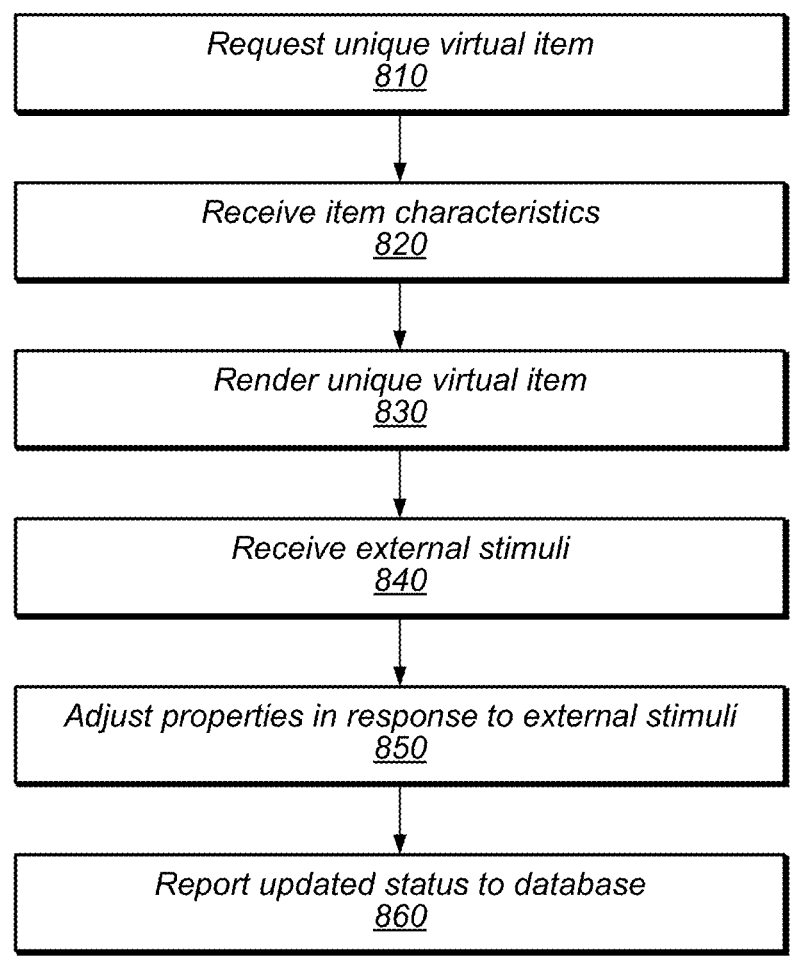
FIG. 8 depicts a high-level logical flowchart of a process for generating a unique virtual item, according to one embodiment.

FIG. 8 depicts a high-level logical flowchart of a process for generating a unique virtual item, according to one embodiment. A unique virtual item is requested (block 810). Item characteristics are received (block 820). The unique virtual item is rendered (block 830). External stimuli are received (block 840). Properties of the unique virtual item are adjusted in response to the external stimuli (block 850). Updated status is reported to a database (block 860).

User Interface for Unique Virtual Items

Figure 9A:
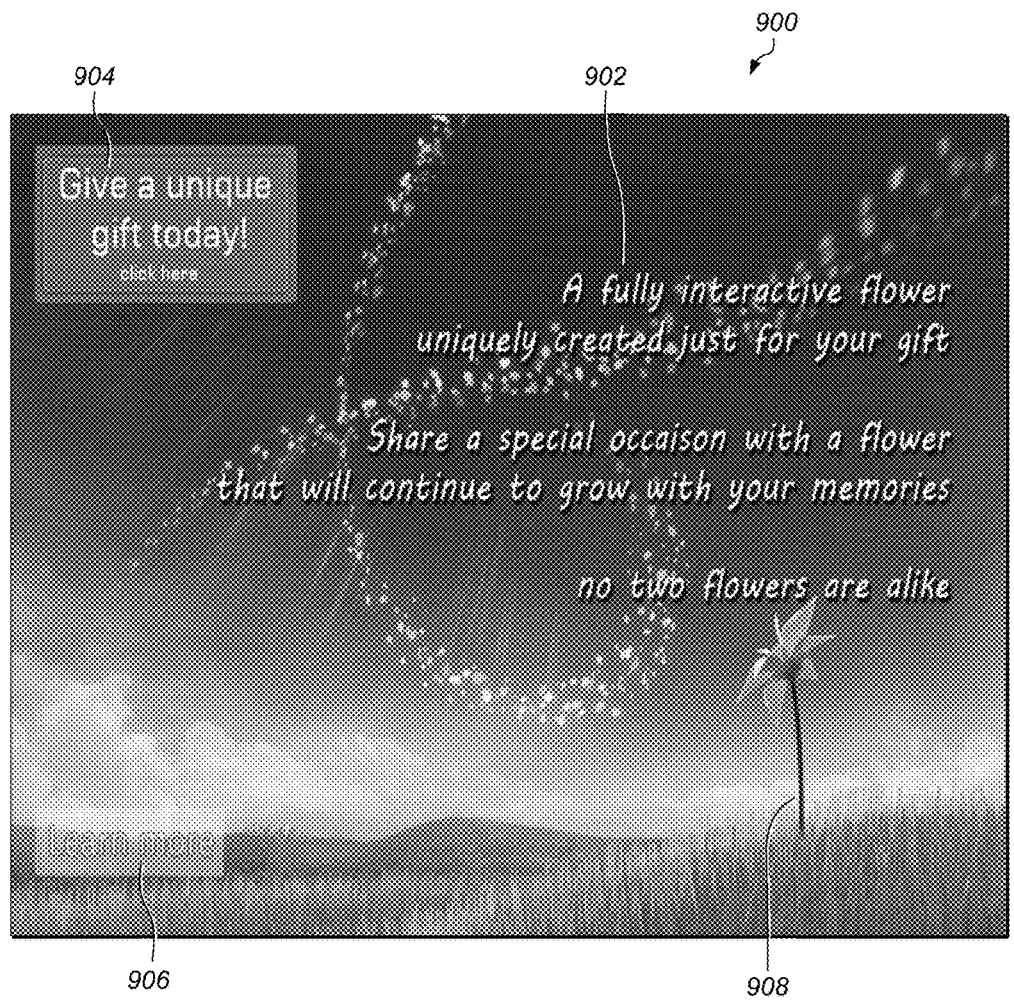
FIG. 9A illustrates an example of a user interface for initiating a transaction request for a unique virtual item with a unique feature set, according to one embodiment.

FIG. 9A illustrates an example of a user interface for initiating a transaction request a unique virtual item with a unique feature set, according to one embodiment. In the example discussed below with respect to FIGS. 9A-9F, the unique virtual item is a graphical rendering of a virtual flower in a simulation environment for allowing interaction with the flower, though one of skill in the art will readily perceived that the principles disclosed herein may be applied to other unique virtual items and rendering clients without departing from the scope and intent of the present specification.

An initial user interface 900 of an ordering interface presents an initial solicitation for a request 902 for a unique virtual item as well as a request interaction tool 904. An information disclosure tool 906 enables an ordering interface to present information about the unique virtual item that is relevant to solicitation for a request 902. A sample item presents an example of a possible unique virtual item that can be created using a rule set associated with initial solicitation for a request 902.

Figure 9B:
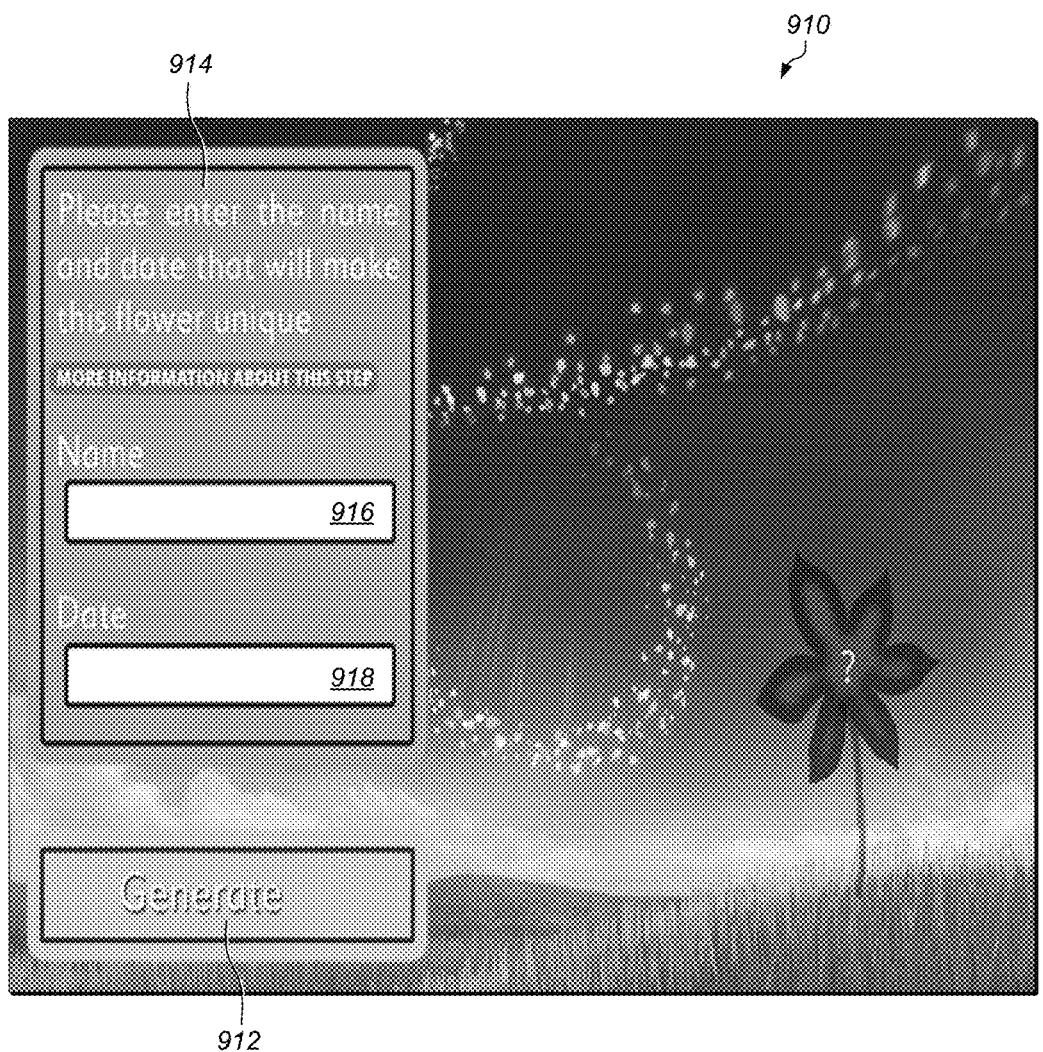
FIG. 9B depicts an example of a user interface for initiating a transaction request for a unique feature set of a unique virtual item, according to one embodiment.

FIG. 9B depicts an example of a user interface for initiating a transaction request for a unique feature set of a virtual item, according to one embodiment. A request generation interface 910 presents a request initiation tool 912 as well as a personalization information entry window 914 including an entry tool for specifying a transaction party 916 and an entry tool for specifying an item of additional personalization information 918. While a name and birthdate are shown as being usable in FIG. 9B, one of skill in the art will readily understand in light of having read the present disclosure that other items of personalization information may be used equally without departing from the scope and intent of the present disclosure. Examples of suitable personalization information include but are not limited to: name, birth date, birth year, social security number, driver's license number, any membership card # for any organization, DNA sequence, biometric measurements (e.g. circumference measurements of waist, torso, bicep, head, thigh, length measurements of legs, arms, nose, etc), password, age, age of first kiss, etc.

Entry tool for specifying a transaction party 916 receives a name of a transaction party, which in some embodiments refers to a person who is the subject of the object being created. A transaction party may or may not be the person interacting with the software (e.g. a virtual gift is being generated then the "subject" would be the person who will ultimately receive the generated flower). "Subject" can also refer to fictional characters or non-human beings (e.g. pets), organizations that sponsor or benefit from a unique virtual item, or virtual characters perhaps created to exist in a virtual world. "Subject" can also refer to an electronic device. It is also possible to create a unique virtual item with incomplete information (e.g., allowing embodiments to generate random bits of an encoding specification or seek information from external information sources). In some embodiments, any information which is unique to the subject can be used as input to generate a corresponding unique virtual item.

Figure 9C:
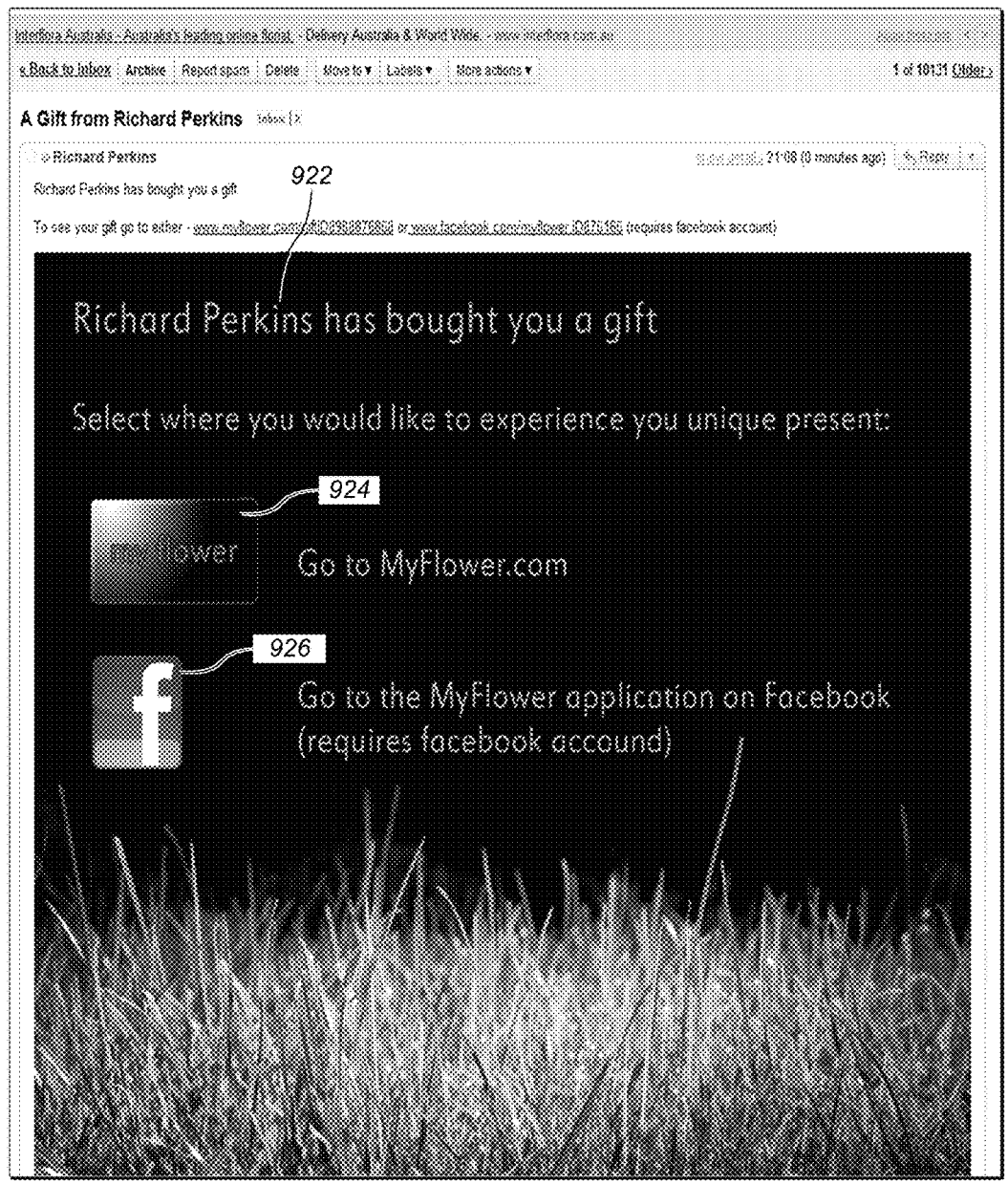
FIG. 9C illustrates an example of a user interface for providing personalization information for a unique feature set of a unique virtual item, according to one embodiment.

FIG. 9C illustrates an example of a user interface for providing notification of creation of a virtual item, according to one embodiment. A notification message 920 informs a user that an identified user 922 has requested creation of a unique virtual item and provides a rendering client launch window for free-standing launch 924 as well as a rendering client launch tool for embedded launch 926. In some embodiments, a user "discovers" the flower, introduced by a poem presented as notification message 920 that celebrates the unique individuality of the user as well as his/her new flower.

Figure 9D:
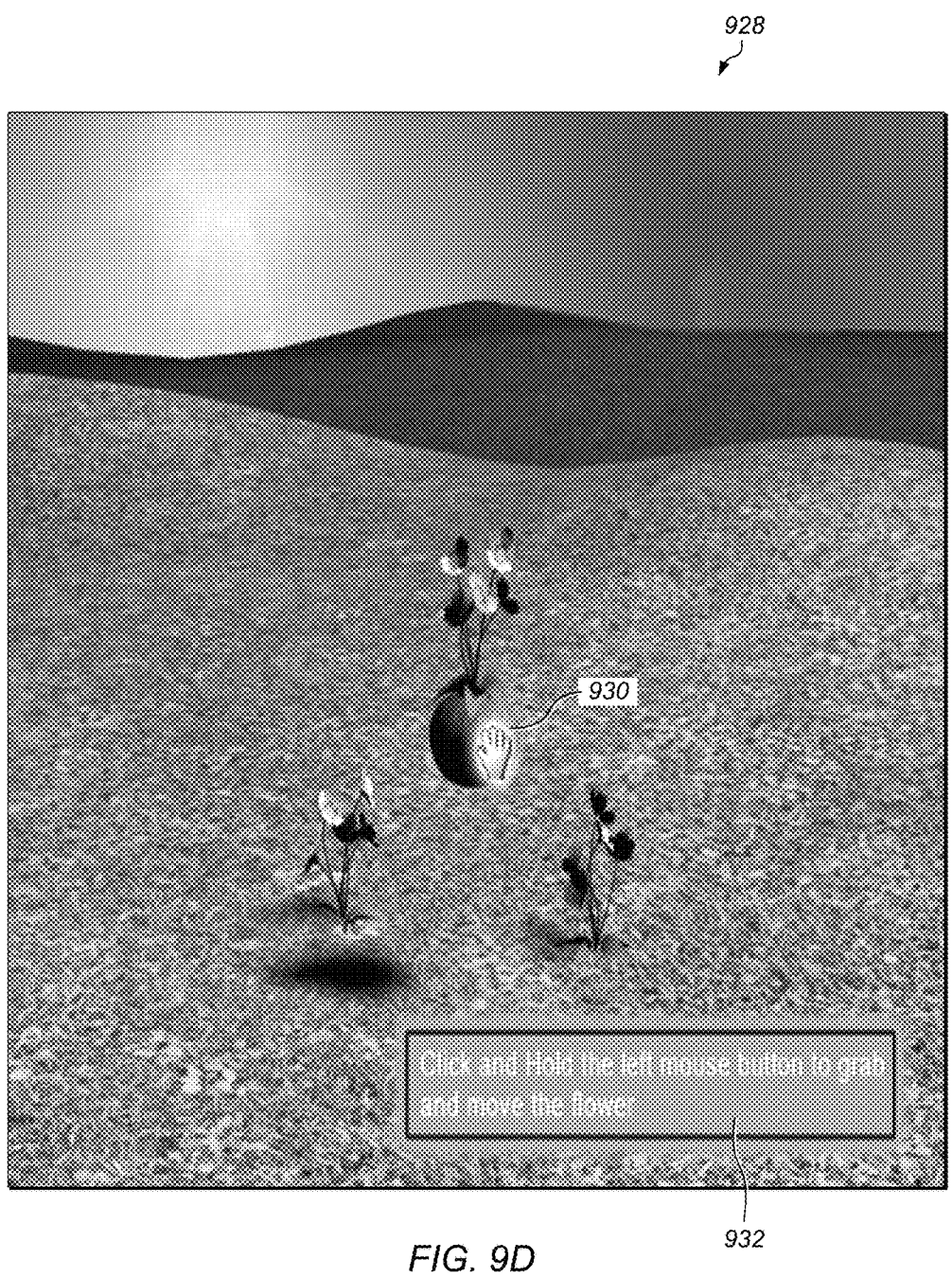
FIG. 9D depicts an example of a user interface for requesting rendering of a unique virtual item, according to one embodiment.

FIG. 9D depicts an example of a user interface for requesting rendering of a virtual item, according to one embodiment. A rendering client interface 928 presents a simulation environment for rendering of a unique virtual item. A placement icon 930 enables a user to specify a location the simulation of client interface 928 for rendering of the unique virtual item. Instructions 932 are provided.

Figure 9E:
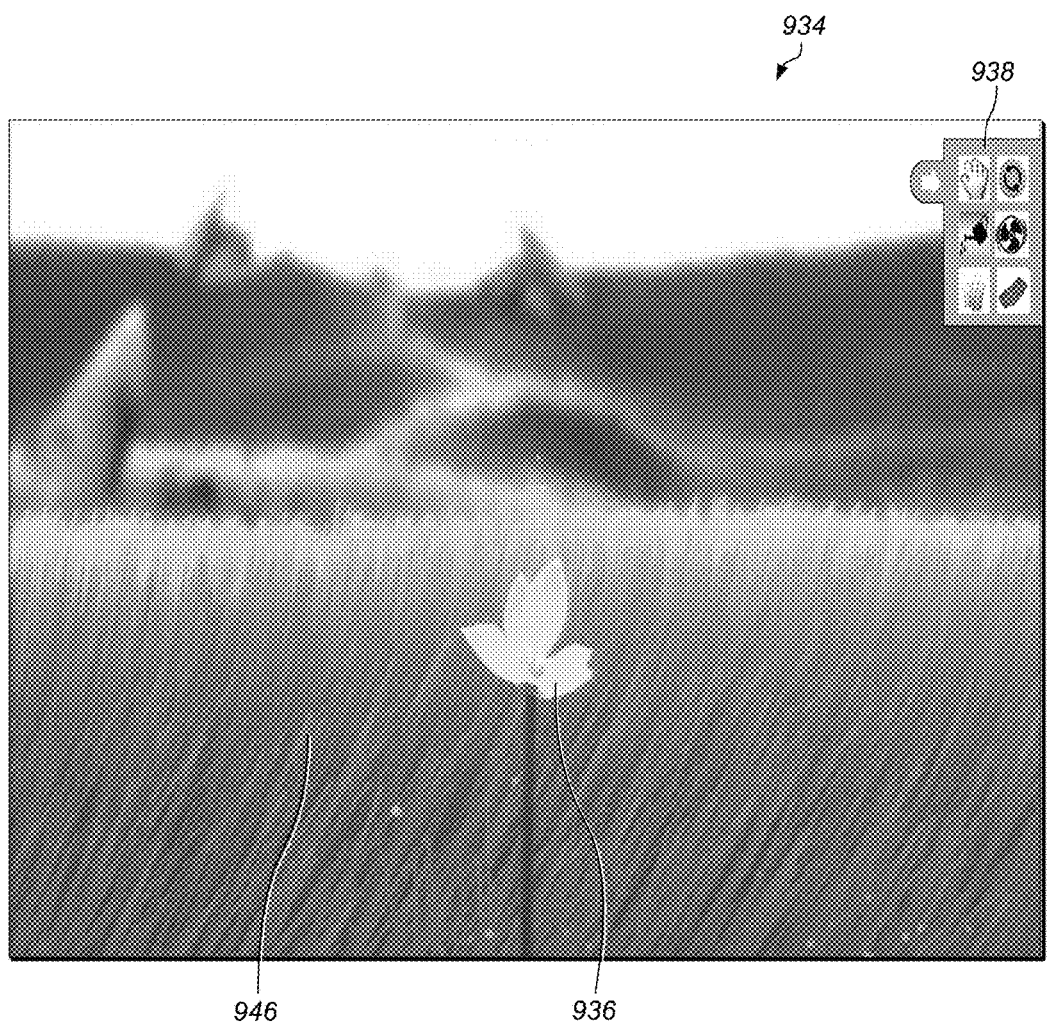
FIG. 9E illustrates an example of a user interface for a unique virtual item, according to one embodiment.

FIG. 9E illustrates an example of a user interface for a virtual item, according to one embodiment. A rendering client interface 934 presents unique virtual item 936 in a simulation environment, as well as external stimuli tools 938 for interacting with unique virtual item 936. Unique virtual item 936 exhibits both visual and behavioral properties. In some embodiments, an environment 946 is user selectable. A user of a rendering client may select the environment where the flower lives by responding to a question such as "Where would you like your new flower to grow?" In some embodiments, options include in the rainforest, on the plains ("Fields of Gold"), beside a crystal stream, on a grassy hill, in the desert, on the beach, in the arctic, on Mars. In other embodiments, a user may be prompted with questions to design a custom environment, with questions such as "Does your flower like it sunny or dark?" In some embodiments, answers to such environmental questions determine when the flower is in bloom during the day or at night.

External stimuli tools 938 may include the ability to perform activities that provide stimuli to the unique virtual item or may alternatively provide interaction with other users. For example, after displaying a flower for first time, the rendering client interface 936 will, in some embodiments, prompt the user to (or simply suggest) sending an image of unique virtual item 936 back to the person who gifted unique virtual item 936 to them, because, in some embodiments, the unique virtual item is not revealed to a user requesting creation until the unique virtual item has been viewed by an intended recipient.

Unique virtual item 936 will exhibit various appearance properties controlled by an encoding specification as embodied by item characteristics. In some embodiments, a single encoding specification will render different sets of item characteristics that vary according to the rendering client used to render the unique virtual item. Examples for unique virtual item 936 include:

Archetype (also known as rule set)—Selecting from a list of possible archetypes which constitute major differences in appearance or model from one to another. In some embodiments, archetypes are different three-dimensional meshes supported by rendering client interface 934. In other embodiments, archetypes are different shape patterns rendered with varying sets of options for any particular rendering client.

Optional Geometry—Selecting between different three-dimensional meshes which are used to complete or augment the appearance of the output unique virtual item 936. In some embodiments, each category of optional geometry has several possible options, one or more of which is selected by mapping the encoding specification to the rule set to create item characteristics.

Geometry Morphing—In some embodiments, a three dimensional mesh that has been selected will exhibit morph targets and input is used to assign a specific combination of those morphs for interpolation between two, three, four, or more morph targets by interpreting input to rendering client interface 934 to determine position, orientation, and other visual appearance characteristics. Flowers may move in response to game stimuli defined to indicate the position of an in-game light source or can exhibit greater or lesser turgidity in response to watering or dessication.

Scale—The scale of the entire unique virtual item 936 or for different optional geometries is, in various embodiments, assigned different scales from the input or in response to game stimuli (e.g., flowers can show increased or decreased scale to "grow" or "wilt" in response to watering or lack thereof).

Color Scheme—The unique virtual item 936 is made with a single color or with multiple colors. Individual optional geometries are colored by a single color or multiple colors. These colors are selected from color spectrums or color palettes specifically created by an artist designing an archetype.

Attributes—Variables which affect the characteristics of the flower in the simulator are affected by the encoding specification. These attributes affect the graphics of the flower over time as the simulator of rendering client interface 934 runs. For example, in some embodiments a heartiness value could is generated from the encoding specification which affects how well the flower resists mistreatment or the elements, making it less likely to droop or sag over time. Reproductive proclivities of the flower are, in some embodiments, determined by such attributes.

In some embodiments, external stimuli tools 938 further include the ability to export a photograph of unique virtual item 936, e.g., to decorate social media profile. In some embodiments, external stimuli tools 938 create a "mood" flower that allows the user to set a happy/sad quotient for unique virtual item 936 and have it update a social media page to reflect a current emotional state. In some embodiments, mood transmission through external stimuli tools 938 only works if the cared-for flower is healthy and well-fed, otherwise the only mood which can be posted is "sad"/unhealthy.

In some embodiments, external stimuli tools 938 further include the ability to send a "living" eCard of unique virtual item 936. In some embodiments, a card of unique virtual item 936 features an image/setting selected by the user and embedded in that image is an image of unique virtual item 936. In some embodiments, the otherwise still image of unique virtual item 936 has, some minor animating elements (e.g., clouds, occasional bird, flower blowing slightly in the breeze, occasional light rain, etc.).

In some embodiments, external stimuli tools 938 further include the ability to create a screensaver for a computer hosting rendering client interface 934. In some embodiments, such a screensaver always shows the of unique virtual item 936 as it appears in rendering client interface 934 and accurately reflects the current status of unique virtual item 936 to stimulate interaction with unique virtual item 936.

In some embodiments, external stimuli tools 938 further include the ability to create an avatar image by allowing a user to "press" the flower (or otherwise capture unique virtual item 936) into a picture that is used as the account setting for an avatar. In some embodiments, unique virtual item 936 is exportable to a game simulation.

While the embodiments portrayed herein are described with respect to a single unique virtual item 936, one of skill in the art will readily understand in light of having read the present specification that some embodiments of rendering client interface 934 support multiple unique virtual items, which may be uniquely created by the comparison and uniqueness bit augmentation systems herein disclosed. In some embodiments, a user of rendering client interface 934 may combine multiple unique virtual items into an assortment (e.g., a bouquet) and perform any of the above-described options with a multiflower version. Additionally, in some embodiments, unique virtual item 936 may be shared between rendering client interface 934 and another user with an analogous rendering client interface, such that a user of rendering client interface 934 may send the flower to a friend (or receive) where he/she can collect several flowers for a flower pot that holds a "family" of flowers (e.g., which perhaps match a set of friends or the members of an actual family). This new object can be used in of the above interaction options and operationsas well.

Figure 9F:
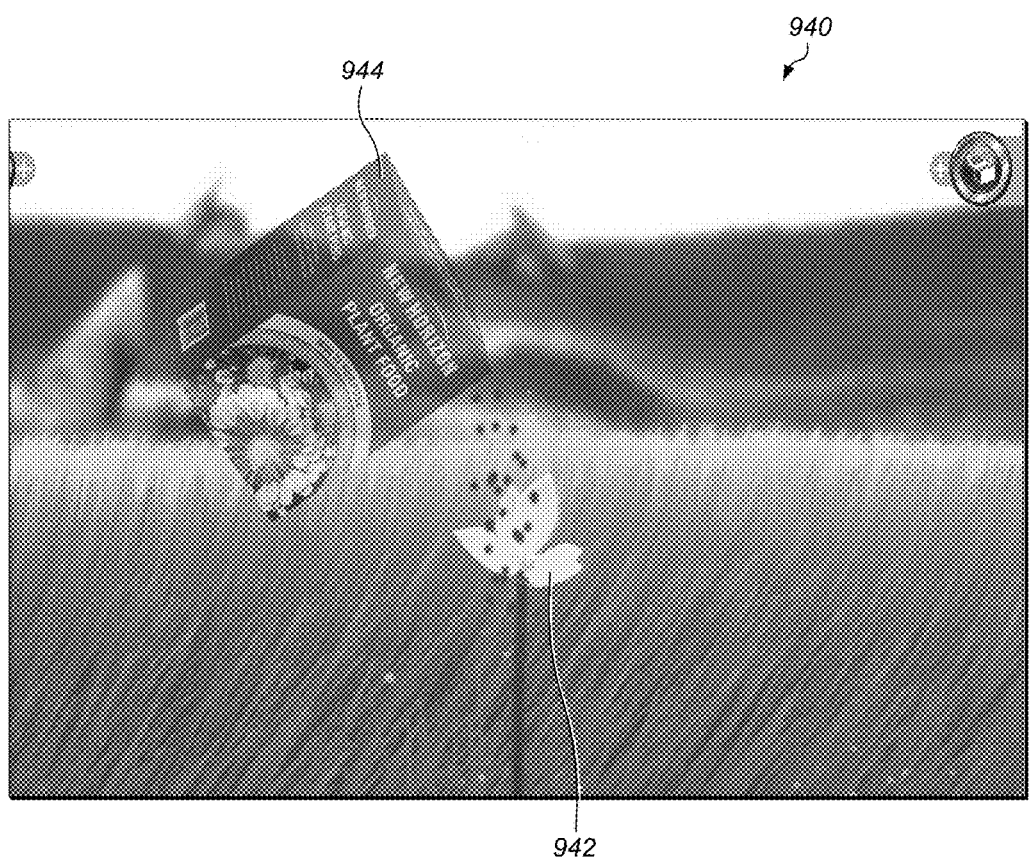
FIG. 9F depicts an example of a user interface for interacting with a unique virtual item, according to one embodiment.

FIG. 9F depicts an example of a user interface for interacting with a virtual item, according to one embodiment. A rendering client interface 940 presents unique virtual item 942 in a simulation environment, as well as external stimuli tool 944 for interacting with unique virtual item 942. External stimuli tool 944 allows the user of rendering client interface 940 care for a flower (by feeding it). In some embodiments, over time as the user cares for unique virtual item 942, it will eventually be visited by a bee (not shown), which will pollinate it. After that point, a simulated breeze will blow pollen (not shown) into the wind (not shown).

Rendering client interface 940 will follow the pollen away from unique virtual item 942, and it will land on the ground sprouting a new flower. Care for unique virtual item 942 may vary between flowers. Some will require more water, some less, some don't like over watering, some like to be watered at night, etc. In some embodiments, unique virtual item 942 will communicate messages, such as horoscope interaction so that unique virtual item 942 will, each day, be set to a mood that reflects user mood. The horoscope setting can have different effects on not just the flower but its environment within rendering client interface 940 as well. In some embodiments of rendering client interface 940, the sun is shining on good days, gloomy on bad ones, and rendering client interface 940 generates "god rays" from the clouds on particularly good days.

Example System

Embodiments of a unique virtual item generating module, a rendering client, an ordering client and/or of the unique virtual item generating techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a unique virtual item generating module, a rendering client, an ordering client and/or of the unique virtual item generating techniques are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks;

via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a unique virtual item generating module, a rendering client, an ordering client and/or of the unique virtual item generating techniques as described herein, and data storage 1035, comprising various data accessible by program instructions 1025. In one embodiment, program instructions 1025 may include software elements of embodiments of a unique virtual item generating module, a rendering client, an ordering client and/or of the unique virtual item generating techniques as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a unique virtual item generating module, a rendering client, an ordering client and/or of the unique virtual item generating techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, the method comprising,
generating an encoding specification for a unique virtual item in response to receiving a request from a sender party, wherein
one or more components of the encoding specification influence appearance properties of the unique virtual item,
said generating comprises deriving a first set of the one or more components from a plurality of items of personalization information,
the plurality of items of the personalization information describe a rule set selection, and
the plurality of items of the personalization information comprise items describing at least one or more transaction parties identified in the request from the sender party or one or more configurable feature specifications indicating requested properties of the unique virtual item;
creating from the encoding specification one or more item characteristics for the unique virtual item, wherein
the creating from the encoding specification the one or more item characteristics for the unique virtual item further comprises selecting based on the one or more components the one or more item characteristics set from a set of options provided by a rule set, and
the one or more item characteristics describe a unique feature set for the unique virtual item in terms customized for a type of a rendering client selected from a plurality of rendering client types to render the unique virtual item;

sending the one or more item characteristics to the rendering client;

displaying the unique virtual item to a recipient party; and denying access to the unique virtual item by the sender party until the unique virtual item is displayed to the recipient party.

2. The method of claim 1, wherein the deriving comprises:

deterministically encoding the plurality of items of the personalization information as the one or more components of the encoding specification;

comparing the one or more components of the encoding specification to a set of encoding specifications registered as also using the rule set; and responsive to discovering a non-uniqueness of the encoding specification, altering a uniqueness component of the encoding specification.

3. The computer-implemented method of claim 1, wherein the one or more item characteristics comprise instructions for rendering a sensory property of the unique virtual item.

4. The computer-implemented method of claim 3, wherein the one or more item characteristics comprise instructions for adjusting the sensory property in response to stimuli received by the rendering client.

5. The computer-implemented method of claim 1, wherein the creating the one or more item characteristics further comprises selecting the one or more components of the unique feature set from options offered by a rule set specified in the rule set selection.

6. The computer-implemented method of claim 1, wherein the personalization information further comprises uniqueness information for setting a uniqueness component of the one or more components based on environmental information.

7. The computer-implemented method of claim 1, wherein the one or more transaction parties further include a transaction party who is neither a sender nor a recipient of the unique virtual item.

8. A system, comprising:

at least one processor; and a memory comprising program instructions, wherein the program instructions are executable by the at least one processor to:

generate an encoding specification for a unique virtual item in response to receiving a request from a sender party, wherein one or more components of the encoding specification influence appearance properties of the unique virtual item, the program instructions executable by the at least one processor to generate the encoding specification further comprise program instructions executable to derive a first set of the one or more components from a plurality of items of personalization information, the plurality of items of the personalization information describe an rule set selection, and the plurality of items of the personalization information comprise items describing at least one or more transaction parties identified for the unique virtual item or one or more configurable feature specifications indicating requested properties of the unique virtual item;

create from the encoding specification one or more item characteristics for the unique virtual item, wherein the one or more item characteristics describe a unique feature set for the unique virtual item in terms customized for a type of a rendering client selected from a plurality of rendering client types to render the unique virtual item, and the program instructions executable to create from the encoding specification the one or more item characteristics further comprise program instructions executable to select based on the one or more components the unique feature set from options offered by an rule set specified in the rule set selection;

send the one or more item characteristics to the rendering client;

display the unique virtual item to a recipient party; and deny access to the unique virtual item by the sender party until the unique virtual item is displayed to the recipient party.

9. The system of claim 8, wherein the program instructions executable to derive the first set of the one or more components from the plurality of items of the personalization information comprise:

program instructions executable to deterministically encode the plurality of items of the personalization information as the one or more components of the encoding specification;

program instructions executable to compare the one or more components of the encoding specification to a set of encoding specifications; and program instructions executable to, responsive to discovering a non-uniqueness of the encoding specification, alter a uniqueness component of the encoding specification.

10. The system of claim 8, wherein the one or more item characteristics comprise instructions for communicating messages to an observer.

11. The system of claim 8, further comprising instructions executable by the one or more processors to receive a request comprising the items describing at least one or more transaction parties and the one or more configurable feature specifications, and generate items of personalization information external to the request, wherein the personalization information external to the request includes a variable derived from an external information source.

12. The system of claim 8, wherein the one or more item characteristics further comprise specifications for generating a physical product.

13. The system of claim 8, wherein the one or more item characteristics further comprise instructions for programming behavior of the unique virtual item.

14. The system of claim 8, wherein the one or more item characteristics further comprise instructions for programming behavior of a physical product.

15. A computer-readable storage medium storing program instructions, wherein the program instructions are computer-executable to implement:

generating a plurality of encoding specifications for respective ones of a plurality of unique virtual items in response to receiving a request from a sender party, wherein said generating comprises deriving a first set of one or more components of each of the plurality of encoding specifications from respective sets of personalization information, the respective sets of the personalization information comprise items describing respective values of one or more configurable feature specifications indicating requested properties of the respective unique virtual items, the deriving comprises deterministically encoding the respective sets of the personalization information as the one or more components of the respective encoding specifications, and the deriving comprises comparing the encoding specifications to ensure uniqueness each of the plurality of encoding specifications;

creating from the plurality of encoding specifications one or more item characteristics for each of the unique virtual items, wherein the one or more item characteristics for each of the unique virtual items describes a respective unique feature set for the respective unique virtual item in terms usable by a rendering client to render the unique virtual items, and the creating the one or more item characteristics for each of the unique virtual items further comprises selecting based on the respective one or more components the respective unique feature set from a set of options;

displaying the unique virtual item to a recipient party; and denying access to the unique virtual item by the sender party until the unique virtual item is displayed to the recipient party.

16. The computer-readable storage medium storing program instructions of claim 15, wherein the deriving comprises:

responsive to discovering a non-uniqueness of an encoding specification, rejecting a request for a virtual item.

17. The computer-readable storage medium storing program instructions of claim 15, wherein the one or more item characteristics comprise instructions for rendering a characteristic linked to an affinity party.

18. The computer-readable storage medium storing program instructions of claim 15, wherein the one or more item characteristics comprise instructions for rendering a three-dimensional physical token embodying the unique virtual item.

19. The computer-readable storage medium storing program instructions of claim 15, wherein the one or more item characteristics comprise instructions for adjusting the appearance properties in response to game condition stimuli.

20. The computer-readable storage medium storing program instructions of claim 15, wherein the item characteristics further include a pointer to an electronic commerce transaction.

* * * * *